United States Patent [19]
Evans

[11] Patent Number: 5,694,524
[45] Date of Patent: Dec. 2, 1997

[54] SYSTEM AND METHOD FOR IDENTIFYING CONDITIONS LEADING TO A PARTICULAR RESULT IN A MULTI-VARIANT SYSTEM

[75] Inventor: Robert B. Evans, Gallatin, Tenn.

[73] Assignee: R. R. Donnelley & Sons Company, Lisle, Ill.

[21] Appl. No.: 196,707

[22] Filed: Feb. 15, 1994

[51] Int. Cl.$^6$ .................................................... G06F 15/18
[52] U.S. Cl. ........................... 395/77; 395/51; 395/62; 395/75
[58] Field of Search .................... 395/10–11, 13, 395/20, 50, 51, 61–62, 63, 75–77, 902, 906, 914; 364/525–526

[56] References Cited

U.S. PATENT DOCUMENTS

| Re. 31,312 | 7/1983 | Eddens | 73/862.48 |
|---|---|---|---|
| 3,822,838 | 7/1974 | Butler, Jr. et al. | 242/75.44 |
| 3,950,988 | 4/1976 | Nowisch et al. | 73/144 |
| 4,130,014 | 12/1978 | Eddens | 73/144 |
| 4,186,309 | 1/1980 | Gnuechtel | 250/561 |
| 4,359,178 | 11/1982 | Hayashi et al. | 226/25 |
| 4,532,500 | 7/1985 | Henk | 340/675 |
| 4,716,978 | 1/1988 | Wales et al. | 177/25 |
| 5,036,706 | 8/1991 | Gnuechtel et al. | 73/597 |
| 5,136,686 | 8/1992 | Koza | 395/13 |
| 5,188,028 | 2/1993 | Reichel | 101/228 |
| 5,269,222 | 12/1993 | Johnson et al. | 101/228 |
| 5,301,866 | 4/1994 | Veh et al. | 226/11 |
| 5,325,774 | 7/1994 | Breton et al. | 101/228 |
| 5,357,812 | 10/1994 | Kübert et al. | 73/862 |
| 5,365,796 | 11/1994 | Lin et al. | 73/862 |
| 5,365,844 | 11/1994 | Miyashige | 101/228 |
| 5,378,918 | 1/1995 | Ötdl | 250/571 |
| 5,414,798 | 5/1995 | Nigawara et al. | 395/75 |
| 5,521,844 | 5/1996 | Karis | 364/551.01 |

OTHER PUBLICATIONS

Wang et al, "A brain tumor diagnostic system with automatic learning abilities"; Proceedings of Third Annual IEEE Symposium on Computer–Based Medical Systems, pp. 313–320, 3–6 Jun. 1990.

Wray Buntine, *Operations on Counting Tables*, Turing Institute, pp. 1–4, Oct. 1989.

Wray Buntine, *Review and Questions on Learning Decision Trees*,Turing Institute, pp. 1–6, Oct. 1989.

Philip A. Chou, *Optimal Partitioning for Classification and Regression Trees*, 13 IEEE Transactions on Pattern Analysis and Machine Intelligence 340–354, Apr., 1991.

Wray Buntine, *Learning Classification Trees*, RIACS & NASA Ames Research Center, pp. 1–25, Nov. 20, 1991.

Jonathan J. Oliver, *Decision Graphs—An Extension of Decision Trees*, (Draft), Monash University, Australia, pp. 1–13, Dec. 15, 1992.

Wray Buntine, Rich Caruana, *Introduction to IND Version 2.1 and Recursive Partitioning*, IND User's Manual, NASA Ames Research Center, Dec. 31, 1992 (including a one page summary of IND Version 2.0 and a two page summary of modifications to IND Versions 0.1 to 2.1).

Wray Buntine, *Tree Classification Software*, presented at The Third National Technology Transfer Conference and Exposition, Baltimore, pp. 1–10, Dec. 1992.

(List continued on next page.)

*Primary Examiner*—Tariq R. Hafiz
*Attorney, Agent, or Firm*—Marshall, O'Toole, Gerstein, Murray & Borun

[57] ABSTRACT

A system and method develops an indication of a cause of a particular result of a process from values associated with attributes which arise during runs of the process. The system includes a data entry device which permits a user to enter data indicating the values of the attributes and a class associated with each of the runs of the process, a memory which stores the data, a processing unit which produces an induction tree having multiple nodes and an output device which provides an indication of the induction tree to a user. At each of a plurality of the nodes of the induction tree, the processing unit divides the values associated with the attributes into value groups, allows a user to select any one of the attributes and designates a value group of the selected attribute as an endpoint of an induction tree when the value group satisfies an endpoint criterion and, otherwise, designates the value group of the selected attribute as a branching point of the induction tree.

64 Claims, 12 Drawing Sheets

OTHER PUBLICATIONS

W.F. Punch III, ed., New NASA Software, *Expert New Products*, p. 97, Aug. 1993.

XpertRule® Analyser™ *Knowledge from Data*, User's Guide (Release 2), published by Attar Software, 1994.

ANGOSS KnowledgeSEEKER, Version 3.0, User's Guide, published by ANGOSS Software Intl., Ltd., 1984–1994.

Wray Buntine, "Recursive Partitioning Skeleton Code," pp.1–2, 1990.

"Recursive Partitioning Skeleton Code," pp. 1–2, Nov. 10, 1990.

Ray Bareiss et al., *Supporting Start–to–Finish Development of Knowledge Bases*, 4 Machine Learning 259–283 (1989).

Peter Clark, Tim Niblett, *The CN2 Induction Algorithm*, 3 Machine Learning 261–283 (1989).

David Draper, Assessment and Propagation of Model Uncertainty (draft version), in *Proceedings of the Fourth International Workshop on Artificial Intelligence and Statistics*, 497–509 (1993).

Cheryl Kasunich et al., *Gravure Process and Technology*, Chs. 4, 6–9, 11–13, 15, pp. 37–64, 99–241, 259–362, 379–398 (Brett Rutherford ed. 1991).

R.S. Michalski, R.L. Chilausky, *Learning by Being Told and Learning From Examples: An Experimental Comparison of the Two Methods of Knowledge Acquisition in the Context of Developing an Expert System for Soybean Disease Diagnosis*, 4 International Journal of Policy Analysis and Information Systems 125–161 (1980).

Mark A. Musen, *Automated Support for Building and Extending Expert Models*, 4 Machine Learning 347–375 (1989).

Claude E. Shannon, Warren Weaver, *The Mathematical Theory of Communication*, pp. 1–5, 30–64 (1963).

Ming Tan, Jeffrey C. Schlimmer, Two Case Studies in Cost–Sensitive Concept Acquisition, in *Proceedings of the Eighth National Conference on Artificial Intelligence*, 854–860 (1990).

John E. Walsh, *Handbook of Nonparametric Statistics*, pp. 10, 50, 194–195, 290, 300 (1962).

Sholom M. Weiss, Casimir A. Kulikowski, *Computer Systems that Learn*, Chs. 5–7, pp. 113–203 (1991).

John R. Anderson, *The Adaptive Character of Thought*, pp. 1, 5–40 (1990).

Usama M. Fayyad, Keki B. Irani, *On the Handling of Continuous–Valued Attributes in Decision Tree Generation*, 8 Machine Learning 87–102 (1992).

R. Lopez de Mantaras, *A Distance–Based Attribute Selection Measure for Decision Tree Induction*, 6 Machine Learning 81–92 (1991).

Samir Padalkar et al., *Real–Time Fault Diagnostics*, IEEE Expert 75–85 (Jun. 1991).

J.R. Quinlan, *Induction of Decision Trees*, 1 Machine Learning 81–106 (1986).

Jude W. Shavlik et al., *Symbolic and Neural Learning Algorithms: An Experimental Comparison*, 6 Machine Learning 111–143 (1991).

Edward E. Smith, Douglas L. Medin, *Categories and Concepts*, Chs. 1, 2, 8, pp. 1–21, 162–182 (1981).

Sholom M. Weiss, Ioannis Kapouleas, An Empirical Comparison of Pattern Recognition, Neural Nets, and Machine Learning Classification Methods, in *Proceedings of the Eleventh International Joint Conference on Artificial Intelligence*, pp. 781–787 (1989).

Douglas H. Fisher, *Knowledge Acquisition Via Incremental Conceptual Clustering*, 2 Machine Learning 139–172 (1987).

Elaine Rich, *Artificial Intelligence* (1983).

John Mingers, *An Empirical Comparison of Pruning Methods for Decision Tree Induction*, 4 Machine Learning 227–243 (1989).

B. L. Whitehall et al., *CAQ: A Machine Learning Tool for Engineering*, vol. 5, No. 4, Artificial Intelligence in Engineering 189–198 (1990).

Jeffrey C. Schlimmer, Incremental Adjustment of Representations for Learning, in *Proceedings of the Fourth International Workshop on Machine Learning*, pp. 79–90 (1987).

Stephen C.-Y. Lu, Kaihu Chen, *A Machine Learning Approach to the Automatic Synthesis of Mechanistic Knowledge for Engineering Decision–Making*, 1 AI EDAM 109–118 (1987).

W. Buntine, D. Stirling, Interactive Induction, in *Machine Intelligence*, vol. 12, pp. 121–137 (Hayes–Michie et al eds. 1990).

Peter Clark, Stan Matwin, Using Qualitative Models to Guide Inductive Learning, in *Proceedings of the Tenth International Machine Learning Conference*, pp. 49–56 (1993).

Keki B. Irani et al., *Applying Machine Learning to Semiconductor Manufacturing*, IEEE Expert 41–47 (Feb. 1993).

J. Ross Quinlan, *C4.5: Programs For Machine Learning* (1993).

Randy Kerber, ChiMerge: Discretization of Numeric Attributes, in *Proceedings of the Tenth National Conference on Artificial Intelligence*, pp. 123–127 (1992).

Bruce W. Porter et al., *Concept Learning and Heuristic Classification in Weak–Theory Domains*, 45 Artificial Intelligence 229–263 (1990).

Robert B. Evans, *An Application of ID3 Using Real Valued Features* (1991).

Robert B. Evans, Doug Fisher, *Overcoming Process Delays with Decision Tree Induction*, IEEE Expert 60–66 (Feb. 1994).

Integral Solutions Limited, *Catalyst Catalog*, p. 47 (1991).

Brochure by Integral Solutions Limited, *ISL—Rules—A Powerful Tool for Generating Embeddable Rules* (May 1989).

Letter to applicant from Integral Solutions Limited, dated Apr. 27, 1992.

Letter to applicant from Infolink Decision Services Limited, dated Jan. 27, 1994.

SYSTEM AND METHOD FOR IDENTIFYING CONDITIONS LEADING TO A PARTICULAR RESULT IN A MULTI-VARIANT SYSTEM

TECHNICAL FIELD

The present invention relates generally to expert systems which use artificial intelligence and more particularly to an expert system which uses interactive inductive learning to identify conditions which lead to a particular result in a multi-variant system.

BACKGROUND ART

Expert systems are used to mimic the tasks of an expert within a particular field of knowledge or domain, or to generate a set of rules applicable within the domain. In these applications, expert systems must operate on objects associated with the domain, which may be physical entities, processes or even abstract ideas. Objects are defined by a set of attributes or features, the values of which uniquely characterize the object. Object attributes may be discrete or continuous.

Typically, each object within a domain also belongs to or is associated with one of a number of mutually exclusive classes having particular importance within the context of the domain. Expert systems which classify objects from the values of the attributes for those objects must either develop or be provided with a set of classification rules which guide the system in the classification task. Some expert systems use classification rules which are directly ascertained from a domain expert. These systems require a "knowledge engineer" to interact directly with a domain expert in an attempt to extract rules used by the expert in the performance of his or her classification task.

Unfortunately, this technique usually requires a lengthy interview process that can span many man-hours of the expert's time. Furthermore, experts are not generally good at articulating classification rules, that is, expressing knowledge at the right level of abstraction and degree of precision, organizing knowledge and ensuring the consistency and completeness of the expressed knowledge. As a result, rules which are identified may be incomplete while important rules may be overlooked.

Still further, this technique assumes that an expert actually exists in the particular field of interest. Furthermore, even if an expert does exist, the expert is usually one of a few and is, therefore, in high demand. As a result, the expert's time and, consequently, the rule extraction process can be quite expensive.

It is known to use artificial intelligence within expert systems for the purpose of generating classification rules applicable to a domain. For example, an article by Bruce W. Porter et al., *Concept Learning and Heuristic Classification in Weak-Theory Domains*, 45 Artificial Intelligence 229–263 (1990), describes an exemplar-based expert system for use in medical diagnosis which removes the knowledge engineer from the rule extraction process and, in effect, interviews the expert directly to determine relevant classification rules.

In this system, training examples (data sets which include values for each of a plurality of attributes generally relevant to medical diagnosis) are presented to the system for classification within one of a predetermined number of classes. The system compares a training example with one or more exemplars stored for each of the classes and uses a set of classification rules developed by the system to determine the class to which the training example most likely belongs. A domain expert, such as a doctor, either verifies the classification choice or instructs the system that the chosen classification is incorrect. In the latter case, the expert identifies the correct classification choice and the relevant attributes, or values thereof, which distinguish the training example from the class initially chosen by the system. The system builds the classification rules from this information, or, if no rules can be identified, stores the misclassified training example as an exemplar of the correct class. This process is repeated for training examples until the system is capable of correctly classifying a predetermined percentage of new examples using the stored exemplars and the developed classification rules.

Other artificial intelligence methods which have been used in expert systems rely on machine induction in which a set of induction rules are developed or induced directly from a set of records, each of which includes values for a number of attributes of an object and an indication of the class of the object. An expert then reviews the induced rules to identify which rules are most useful or applicable to the classification task being performed. This method has the advantage of using the expert in a way that the expert is accustomed to working, that is, identifying whether particular rules are relevant or useful in the classification task. It should be noted, however, that all of the relevant attributes of the objects being classified must be identified and data for those attributes must be provided within the records in order for the system to induce accurate and complete classification rules.

A book chapter written by W. Buntine, D. Stirling, Interactive Induction, in *Machine Intelligence*, Vol. 12, pp. 121–137 (Hayes-Michie et al. eds., 1990), discloses that expert systems which use machine induction can be operated with greater accuracy if a domain expert interacts with the system by supplying additional subjective knowledge before classification rules are induced or by incrementally evaluating and validating the rules which are induced. Specifically, the domain expert can develop domain grammar which can be used to elicit relevant classification rules, suggest potential rules and identify whether particular induced rules are strong or weak in the domain context.

An example of an expert system which allows an expert to interact with the system prior to a rule induction process is described in a paper by Peter Clark, Stan Matwin, Using Qualitative Models to Guide Inductive Learning, in *Proceedings of the Tenth International Machine Learning Conference*, 49–56 (1993). This expert system uses an expert generated qualitative model in conjunction with a set of training records, each having data for a number of attributes associated with the domain, to develop classification rules for the domain. The qualitative model represents the attribute relationships which are considered credible within the domain by the expert. During rule induction, only the rules which are consistent and explainable with respect to the qualitative model are tested using the training records. The qualitative model thereby reduces learning time by the eliminating potential rules which are already known to be inapplicable within the domain.

A classic example of a pure machine induction technique is described in an article by J. R. Quinlan, *Induction of Decision Trees*, 1 Machine Learning 81–106 (1986), the disclosure of which is hereby incorporated by reference herein. This technique searches through relations between combinations of attribute values and classes of objects to build an induction tree which is then used to generate precise classification rules. Referring to FIG. 1 herein, an exemplary Quinlan-type induction tree is constructed for a set of 100 records, each associated with an object having one of two classes C1 or C2 and attribute values A__1 or A__2, B__1 or B__2, and C__1 or C__2 for three attributes A, B and C, respectively.

During operation, the Quinlan method calculates a statistical measurement, referred to as an information gain value, for each of the attributes A, B and C and chooses the attribute with the highest information gain value at a root of the tree. The attribute values associated with chosen attribute are then identified as nodes of the tree and are examined. If all of the data records associated with a node are all of the same class, the node is labeled as a leaf or endpoint of the induction tree. Otherwise, the node is labeled as a branching point of the induction tree. The method then chooses a branching point, calculates the information gain value for each of the remaining attributes based on the data from the records associated with chosen branching point, chooses the attribute with the highest information gain value and identifies the attribute values of the chosen attribute as nodes which are examined for leaves and branching points. This process is repeated until only leaves remain within the induction tree or until, at any existing branching point, there are no attributes remaining upon which to branch.

Referring to FIG. 1, the attribute A is chosen at the root of the induction tree and the attribute values A__1 and A__2 which are nodes of the induction tree are then examined. Attribute value A__1 is a leaf of the induction tree because all of the records associated therewith are associated with the class C1. The attribute value A__2 is a branching point BP1 and the attribute B branches therefrom. Likewise the attribute C branches from the attribute value B__1, which is labeled as branching point BP2. The attribute values B__2 and C__1 are leaves of the induction tree. The induction tree stops branching from a branching point BP3 because there are no remaining attributes upon which to branch at that node.

After an induction tree is constructed, classification rules are generated therefrom by tracing a path from a particular leaf of the induction tree to the root of the induction tree or vice versa. Thus, for example, the induction tree of FIG. 1 produces the following classification rules:

(1) C__1 and B__1 and A__2 results in C1;

(2) B__2 and A__2 results in C2;

(3) A__1 results in C1.

Although the Quinlan method is useful in identifying classification rules for a particular domain, the method is limited to attributes which have discrete values. However, techniques have been developed for discretizing numeric or real valued attributes within a Quinlan-type induction tree.

A simple method of discretizing a real valued attribute is to choose generally known break points throughout the range of the attribute. For example, the real valued attribute of age may be divided according to the generally accepted break points of child (0–10), adolescent (11–17), adult (18–45), middle-age (46–70), and elderly (70 and higher). Such a predetermined discretization method, however, is only possible if generally accepted break points exist within the domain. Furthermore, such a predetermined discretization method is only as accurate as the actual break points chosen and fails to account for concepts not identified by the predetermined break points. Thus, in the age example given above, any concept dealing with legal drinking age is unascertainable. For this reason, this method is a particularly poor technique of discretizing real valued attributes in a domain about which a system designer has little a priori information.

Other simple discretization methods include dividing the continuous range of an attribute into intervals of equal size or dividing the continuous range of an attribute into intervals which include an approximately equal number of attribute values. However, with both of these methods, it is difficult or impossible for the system to learn unknown concepts because these methods ignore the distribution of the classes associated with the attribute values. Furthermore, it is very unlikely that the interval boundaries will be established in the places that best facilitate accurate classification using any of these methods.

An paper by Randy Kerber, ChiMerge: Discretization of Numeric Attributes, in *Proceedings of the Tenth National Conference on Artificial Intelligence*, 123–127 (1992), describes a method of discretizing real valued attributes which takes into account the class associated with each attribute value. This method constructs an initial discretization having one attribute value per interval. The method then computes the chi-squared value for each pair of adjacent intervals and merges the pair of adjacent intervals with the lowest chi-squared value. The steps of computing the chi-squared values and merging continues in this manner until all pairs of intervals have chi-squared values which exceed a predetermined threshold.

Other discretization methods divide continuous-valued attributes into only two intervals separated at a cut point. One way to determine such a cut point is to evaluate every possible cut point, calculate the class entropy (i.e., the information gain value) of the attribute from the resulting partition and choose the cut point which results in the best class entropy measurement.

A problem associated with these discretization methods, however, is that they are computationally expensive, especially when a great number of attributes have been identified for a particular object or when a large number of records are used to induce classification rules. As a result, expert systems employing these discretization methods may be limited to discretizing the values of each real valued attribute once during the tree building process.

SUMMARY OF THE INVENTION

According to one aspect of the present invention, a system is provided for developing an indication of a cause of a particular result of a process from values associated with attributes which arise during runs of the process, wherein the runs during which the particular result occurred are in a first class and the runs during which the particular result did not occur are in a second class. The system includes data entry means, such as a keyboard or a disk drive, for permitting a user to enter data indicating the values of the attributes and the class associated with each of the runs of the process. The system also includes a memory for storing the data, a processing unit for processing the data to produce an induction tree and an output device which provides an indication of the induction tree to the user for use in determining a cause of the particular result.

The processing unit preferably includes means for dividing the values associated with each of the attributes into value groups, means for allowing a user to select any one of the attributes and means for designating a value group of the selected attribute as an endpoint of an induction tree when the value group satisfies an endpoint criterion and, otherwise, designating the value group of the selected attribute as a branching point of the induction tree. The processing unit also preferably includes means operative when a value group of the selected attribute is designated as a branching point for redividing the values associated with attributes other than the selected attribute into further value groups, means for permitting a user to select a further attribute, and means for determining whether any further value group of the further attribute satisfies the endpoint criterion and thus comprises an endpoint of the induction tree.

Preferably, the processing unit ascertains whether a predetermined percentage of the runs during which the values within the value group arose are associated with the first or the second class to determine whether an endpoint criterion is satisfied. Furthermore, the processing unit may include means for calculating a figure of merit for each attribute from the value groups of the attribute and means for indicating the figures of merit to the user before the user selects one of the attributes.

Also preferably, each value group designated as a branching point contains a certain number of values which are associated with a certain number of runs and the redividing means redivides only the values associated with attributes other than the selected attribute and which are associated with the certain number of runs.

A class heuristic indicating an expected distribution of classes among the value groups of one of the attributes may be defined and the dividing means may include means for determining whether an actual distribution of classes associated with the value groups of the one attribute is consistent with the class heuristic. Preferably, the system includes means for notifying a user when the actual distribution of classes associated with the value groups of the one attribute is inconsistent with the class heuristic.

Also preferably, the values associated with a particular attribute are in a continuum and the dividing means divides the continuum into a plurality of ranges such that each value group associated with the particular attribute includes the values within one of the ranges. The dividing means includes means for separating the values of the one attribute into first and second sets according to the classes of the runs associated with the values, first means for measuring a statistical property of the first set, second means for measuring a statistical property of the second set and means for developing the plurality of ranges from the statistical properties of the first and second sets.

The developing means may include means for deriving first and second subsets of values from the first and second sets wherein the first subset includes the values of the first set which are greater than the statistical property of the first set and the second subset includes the values of the second set which are less than the statistical property of the second set. The processing unit may determine statistical properties of the first and second subsets and replace the statistical properties of the first and second sets with the statistical properties of the first and second subsets, respectively, if the statistical property of the first subset is less than the statistical property of the second subset.

When the statistical property of the first subset is greater than or equal to the statistical property of the second subset the processing unit may define a first range having a region below the statistical property of the first set, a second range having a region between the statistical property of the first set and the statistical property of the second set and a third range having a region above the statistical property of the second set. The statistical property of the first set may be the same as the statistical property of the second set and, preferably, both statistical properties comprise a median.

According to another aspect of the present invention, an apparatus constructs an induction tree having a plurality of nodes for use in determining a cause of a particular result of a process from a data set. The data set includes values for attributes which arise during runs of the process and indications of a class associated with each of the runs of the process. The apparatus includes data entry means for permitting a user to enter the data set and a memory for storing the data set, a processing unit for processing the data set to generate an induction tree and an output device for providing an indication of the induction tree to a user. The processing unit includes means for dividing the values within the data set and associated with each of the attributes into value groups at a plurality of nodes and means coupled to the dividing means for allowing a user to select one of the attributes at the plurality of nodes. Means are coupled to the allowing means for designating one of the value groups of the selected attribute as an endpoint of the induction tree when the one of the value groups satisfies an endpoint criterion and, otherwise, designating the one of the value groups of the selected attribute as a branching point of the induction tree. Each branching point contains a certain number of values associated with a certain number of runs. Furthermore, means are coupled to the designating means and to the dividing means and are operable when a value group of the selected attribute has been designated as a branching point for redefining the data set to include the values associated with the certain number runs.

According to a further aspect of the invention, a method of forcing a repetitively-executed process toward a particular outcome comprises the steps of determining attributes which potentially affect the outcome, collecting data indicative of each attribute during a number of prior runs of the process and obtaining data indicative of the outcome of each prior process run. An induction tree is interactively constructed from the collected data and the obtained data. A path is then found within the induction tree which indicates that the particular outcome is more likely to occur than not and is used to specify attribute values for a subsequent run of the process in order to control the occurrence of the particular outcome within the process.

According to a still further aspect of the invention, a method of determining a cause of a particular result of a process from values associated with attributes arising during runs of the process comprises the steps of (a) defining a data set to include the plurality of values, (b) dividing the values associated with the attributes within the data set into value groups, (c) allowing a user to select one of the attributes, (d) designating a value group of the selected attribute as an endpoint of an induction tree when the value group satisfies an endpoint criterion and, otherwise, designating the value group of the selected attribute as a branching point of the induction tree, wherein the value group designated as a branching point contains a certain number of values which are associated with a certain number of runs, (e) redefining the data set to include only the values associated with the certain number of runs, and (f) repeating steps (b) through (e) until a value group is designated as an endpoint in step (d). One or more of the value groups designated as the endpoint or as branching points within a path from a root of the induction tree to the endpoint are identified as a cause of the particular result and may be used to control the process to increase or decrease the occurrence of the particular result therein.

DESCRIPTION OF THE PREFERRED EMBODIMENT

Figure 2:
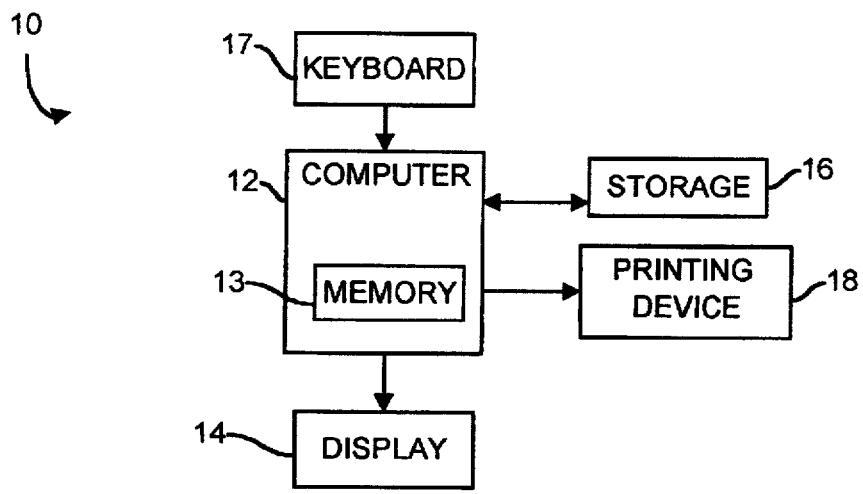
FIG. 2 comprises a system for use in building an induction tree according to the present invention.

Referring now to FIG. 2, a system 10 which constructs induction trees for the purpose of identifying conditions leading to a particular result in a multi-variant system includes a computer 12 having a memory 13 therein. The computer 12 is connected to a display 14 and to a data storage device 16 which stores a plurality of data used by the computer 12. An input device, such as a keyboard 17, allows a user to enter data and otherwise interact with the computer 12. If desired, the storage device 16 may comprise a disk drive which alternatively or additionally allows a user to input data into the computer 12. A printing device 18 is attached to the computer 12 and is capable of printing induction trees developed by the computer 12 and/or other information generated by the computer 12. Other input/output devices might alternatively or additionally be used.

Figure 3A:
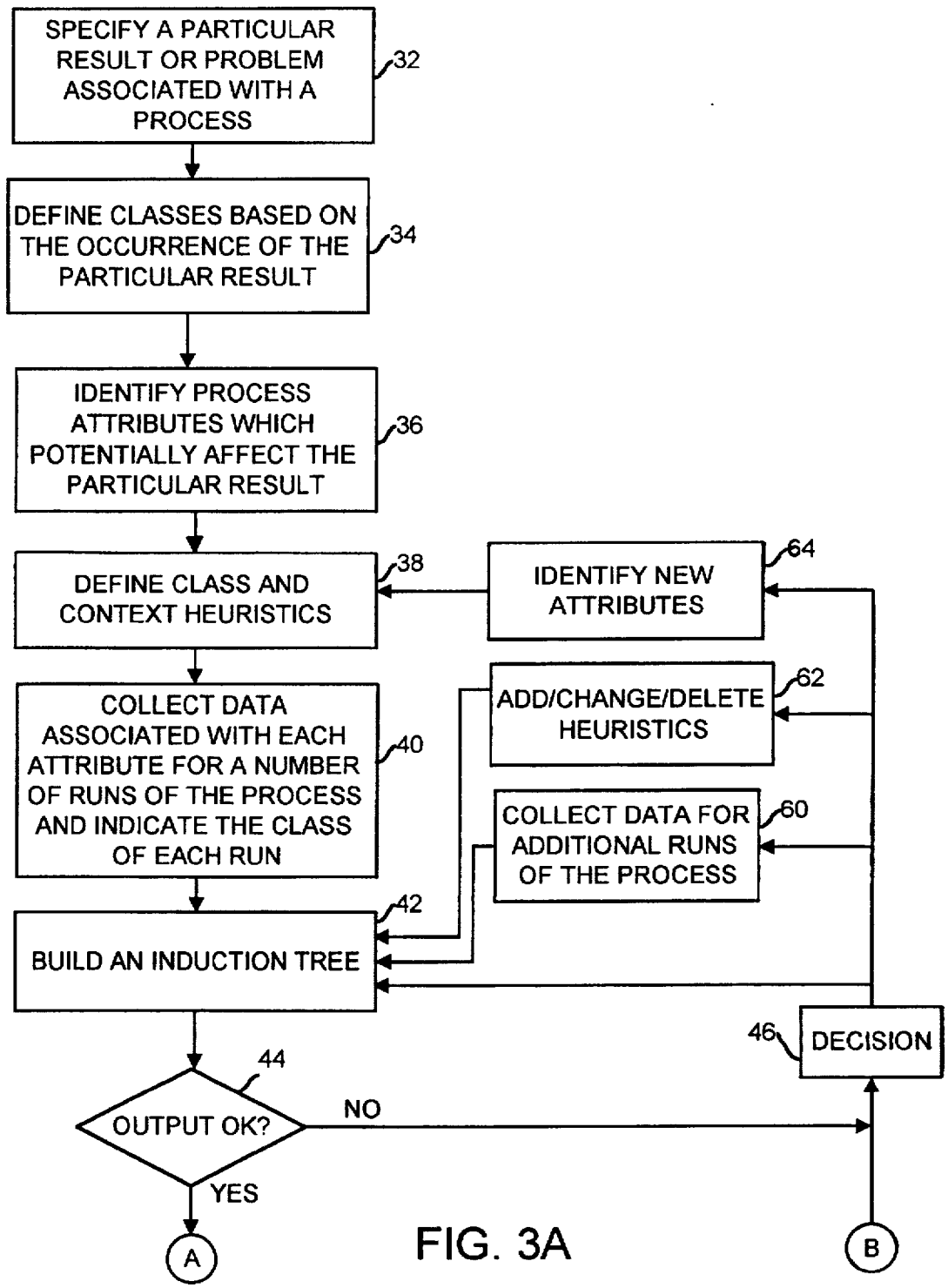
FIGS. 3A and 3B, when joined along similarly lettered lines, together comprise a flowchart of steps undertaken during a method of interactively identifying conditions leading to a particular result in a multi-variant system according to the present invention.
Figure 3B:
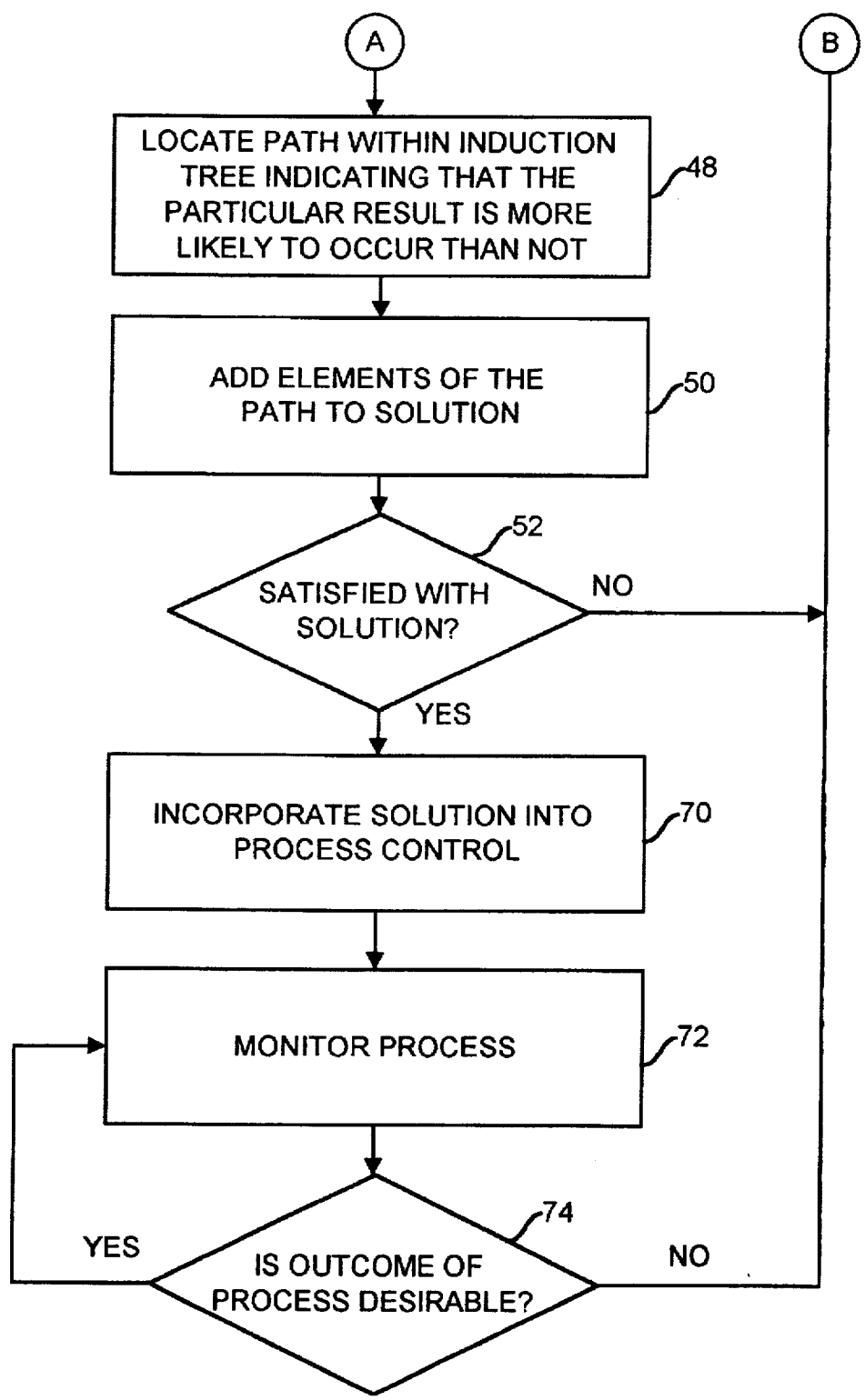

Referring now to FIGS. 3A and 3B, a flowchart illustrates a method which may be implemented in part by programming executed by the computer 12 which interactively identifies conditions leading to a particular result and which prescribes and implements a solution which increases or decreases the probability of occurrence of the particular result. Although the method is described as being used to identify conditions in a process, it should be noted that the method can instead be applied to any system or domain having measurable attributes. Furthermore, the particular result described hereinafter comprises an undesirable outcome of a process and the method is used to decrease the occurrence of the particular result. It should be noted, however, that the particular result could instead comprise a desirable outcome or other desirable effect associated with the process and the method could be used to increase the probability that the particular result will occur.

At the start of the method, at a step 32, a domain expert who is knowledgeable about a process specifies a particular result associated with the process. At a step 34, the domain expert defines classes associated with the particular result. Typically, the nonoccurrence of the particular result is associated with a first class and the occurrence of the particular result is associated with a second class.

At a step 36, the domain expert identifies attributes or features of the process which are potentially relevant to the occurrence of the particular result of the process. These attributes can be continuous, e.g., real valued, or discrete. If an attribute is discrete, the domain expert must identify the discrete values or categories that a value of the attribute can assume.

In order for the method to be ultimately successful in determining the cause of the particular result or in prescribing a solution which increases or decreases the probability of the occurrence of the particular result, it is important that all of the attributes which are actually relevant to the particular result be identified. If attributes which are actually relevant to the particular result are not identified at the step 36, the method may fail to determine the cause of the particular result or may produce an incomplete or inaccurate solution. However, identifying attributes which are not actually relevant to the occurrence of the particular result will not degrade the performance of the method or the solution ultimately obtained thereby.

At a step 38, the domain expert identifies class and context heuristics or rules associated with the attributes identified at the step 36. A class heuristic represents a known relationship between the distribution of classes and specific portions of the range of an attribute. A class heuristic preferably specifies that a particular range of an attribute should include a higher or lower proportion of attribute values which are associated with a particular one of the classes than any other range of the attribute. Class heuristics are used to prevent the method from searching for induction rules which are already known to be inaccurate in connection with the domain or the process.

A context heuristic represents an order of priority between two or more attributes. A context heuristic may, for example, specify that it is meaningless to search for induction rules associated with one of the identified attributes before searching for induction rules associated with a different one of the attributes. The attribute with the lower priority is said to be inactive within the context heuristics until the method has examined the attribute with the higher priority.

At a step 40, data or values are collected for each of the attributes for each of a number of runs of the process. A plurality of data records are then created, each of which includes values for the attributes identified at the step 36 along with the class associated with a particular run of the process. The plurality of records comprises a database which is used to develop induction rules associated with the process and which is stored within the storage device 16 of FIG. 2, preferably in text format. It is important that the values for the attributes are measured accurately. Inaccurate and/or incomplete data may lead to an inaccurate determination of the cause of the particular result or may lead to an inaccurate solution for increasing or decreasing the probability of the occurrence of the particular result.

Figure 1:
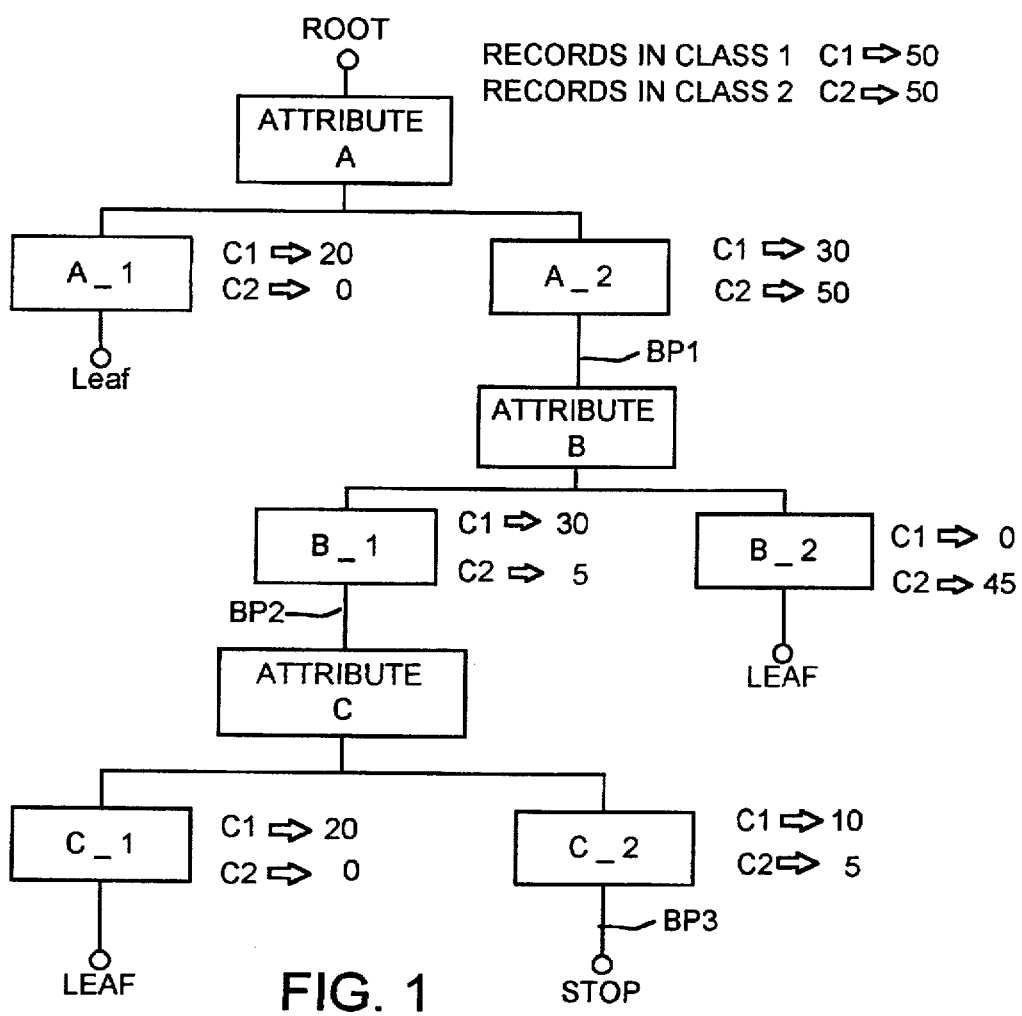
FIG. 1 comprises a diagram illustrating an induction tree constructed according to a prior art method.

At a step 42, the records created at the step 40 are used to construct an induction tree, the final form of which is similar to the induction tree illustrated in FIG. 1. Preferably, at the step 42, the domain expert is allowed to guide the construction of the induction tree interactively. Each induction tree created at the step 42 indicates relationships between values of the attributes and the classes identified for the process. An indication of the induction tree may be provided to a user via, for example, the printing device 18 of FIG. 2.

At a step 44, the domain expert reviews the induction tree to determine whether the induction tree is satisfactory, i.e., whether any potentially relevant induction rules may be suggested thereby. If the induction tree is not satisfactory because, for example, no induction rules can be identified or the induction rules which are identified are not implementable in the process due to economic, social, quality or other reasons, the method proceeds to a decision step 46.

However, if the induction tree is satisfactory, the method proceeds to a step 48 of FIG. 3B at which the domain expert locates one or more paths within the induction tree which indicate that the particular result is more likely to occur than not. Conversely or in addition, the domain expert may also locate one or more paths within the induction tree which indicate that the particular result less likely to occur than not. Each path identified by the expert may comprise one or more attribute values or ranges of attribute values associated with runs of the process that fall exclusively or almost exclusively into one of the classes defined at the step 34. Any particular induction tree may suggest any number of paths which lead to one or more components of a solution which, when used to control the process, will affect the probability of the occurrence of the particular result.

Rather than identifying induction rules manually by identifying such paths, the identification of induction rules can be performed automatically. A book written by J. R. Quinlan, C4.5: *Programs for Machine Learning* (1991), the disclosure of which is hereby incorporated by reference herein (in particular, chapters 5 and 9 and the appendix thereof), discloses a technique which automatically searches for and identifies induction rules within an induction tree. At a step 50, the components of the paths identified at the step 48 are added to a solution list, which may be stored in the memory 13 or the storage device 16 associated with the computer 12 of FIG. 2. Typically, different paths of either the same or different induction trees may identify different ranges of the same attribute as one of the solution components. If these ranges are not mutually exclusive, and where it is practical to do so, the domain expert preferably adopts the range included in all of the paths as the ultimate solution component.

At a step 52, the domain expert determines whether he or she is satisfied with the solution as compiled in the solution list. If the domain expert believes that the solution is not complete, the method proceeds to the decision step 46 of FIG. 3A.

At the step 46, the domain expert chooses one of a number of options in order to improve the quality of the induction tree constructed at the step 42 and to enhance the solution compiled at the step 50. Following the step 46, a new induction tree may be built at the step 42 with further input from the domain expert.

Furthermore, following the step 46, the method may proceed to a step 60 at which data is collected for additional runs of the process. The resulting additional records are added to the database used at the step 42 to build an induction tree. In this manner, a more complete or informative induction tree can be constructed at the step 42.

The method may instead proceed to a step 62 wherein the domain expert changes, adds and/or deletes one or more of the class and/or context heuristics previously identified for the domain. This is particularly useful when an induction tree indicates that the class heuristics previously identified are incorrect.

Furthermore, the method may instead proceed to a step 64 wherein the domain expert identifies additional attributes which may be relevant to the occurrence of the particular result but which were not previously identified. This is particularly useful when the induction tree developed at the step 42 does not present any clear results. At the step 64, the domain expert can also delete attributes from the set of attributes previously identified when, for example, the expert believes that those attributes are not, in fact, relevant to the particular result. If at least one new attribute is identified at the step 64, the method returns to the step 38 at which class and context heuristics for the new or already identified attributes are defined. At the step 40, data for a new plurality of runs of the process are collected to produce records having data for all of the attributes, including the newly identified attribute(s).

When, at the step 52 of FIG. 3B, the expert is satisfied with the solution obtained at the step 50, the solution is incorporated into the process by running the process at a step 70 so that the process attributes have values within the ranges specified by the solution. At a step 72, the process is monitored during subsequent runs thereof and a determination is made at a step 74 whether the solution has been adequate in achieving a desired outcome, for example, eliminating the particular result from the process in an acceptable manner.

If the outcome of the process is desirable, the method returns to the step 72 which continues to monitor the outcome of the process. If, however, the outcome of the process is not desirable or if the outcome of the process returns to an undesirable condition during further monitoring of the process, the method returns to the step 46 of FIG. 3A at which the expert builds a new induction tree, collects additional data for the identified attributes, changes heuristics or identifies new attributes, all in an effort to generate a more complete or accurate solution.

Generally, the induction tree constructed at the step 42 has a root and any number of nodes which branch from either the root or from another node of the induction tree. The induction tree is constructed iteratively and performs the same operations at the root and each node using only data contained in records which are in a "current" database which has a content that varies with position in the induction tree. At the root of the induction tree, the current database includes all of the records produced at the steps 40 and 60. The current database associated with any particular node of the induction tree includes a subset of the records of the database associated with the node (or root) from which the particular node branches.

Figure 4:
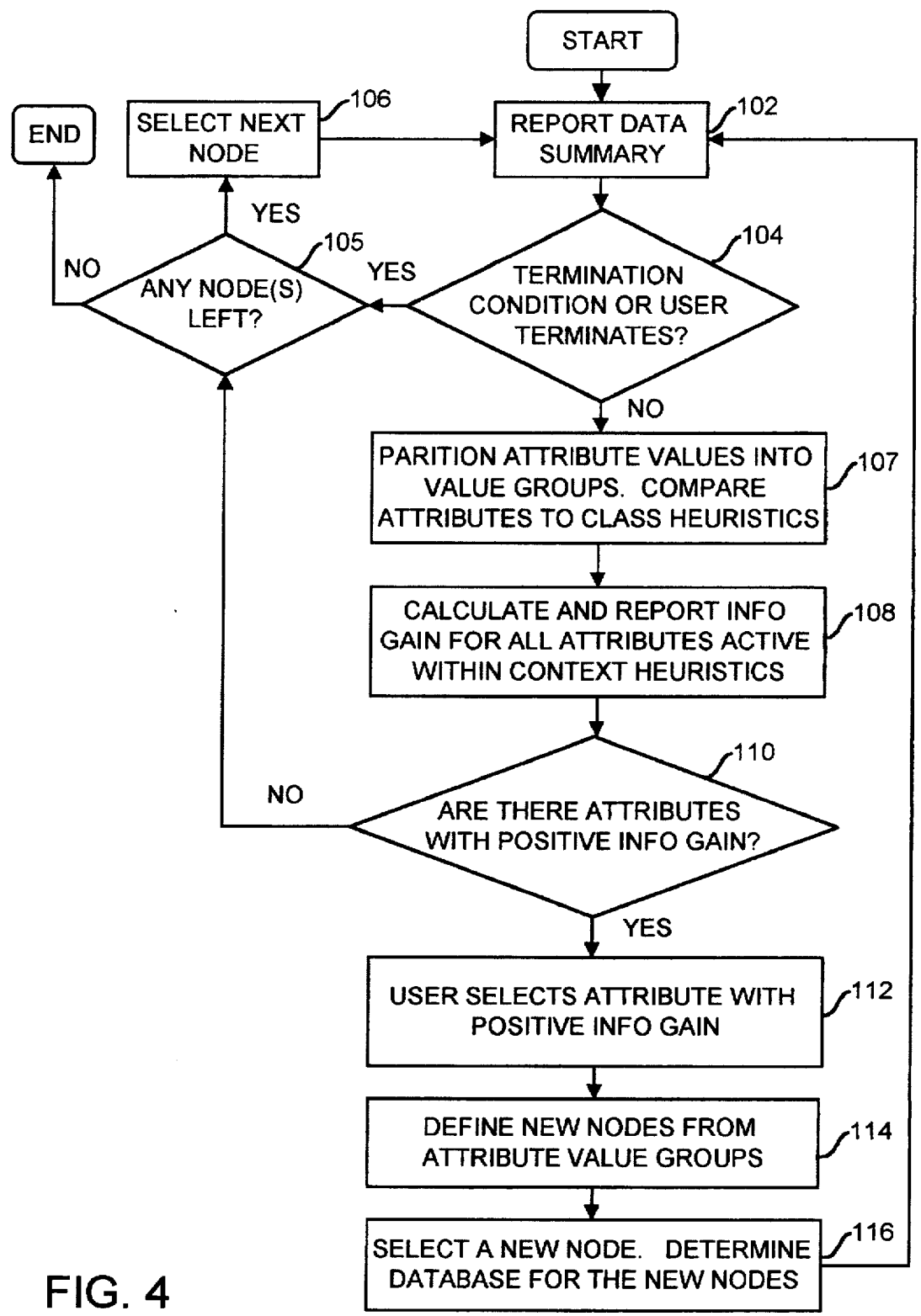
FIG. 4 comprises a flowchart of programing executed by the computer system of FIG. 2 for implementing a portion of the method of FIGS. 3A and 3B.

FIG. 4 illustrates a flowchart of programming, preferably in LISP (a commercially available programming language particularly suited for artificial intelligence applications), which is executed by the computer 12 to implement the step 42 of FIG. 3A. The programming begins at a block 102 which reports a summary of the records within the current database to the user via, for example, the display 14 of FIG. 2. Preferably, this summary indicates the number of records within the current database which are associated with each of the classes identified at the step 34 of FIG. 3A. The summary also identifies whether all of the records within the current database have the same value for any particular attribute and provides a characterization list which identifies the attributes for which that condition is satisfied. Still further, the summary may also list the values of one or more attributes and indicate the classes of the records having these values to provide the expert with more information about the records within the current database.

A block 104 then determines if a node termination condition is present. Preferably, a node termination condition exists if at least a predetermined percentage of the records within the current database are associated with the same class, in which case the node is labeled as an endpoint or a leaf of the induction tree. A node termination condition may also exist if all of the attributes active within the context heuristics have been selected as a branch within a path from the node to the root of the tree. Alternatively, a user can manually terminate the node using, for example, the keyboard 17 of FIG. 2 or another input device.

If a node termination condition exists, the block 104 terminates branching from the node and a block 105 determines if any unexamined nodes remain. If no unexamined nodes remain, the induction tree is complete and the program ends. If, however, all of the nodes have not been examined, a block 106 locates the next node, updates the current database to be that associated with the next node and returns control to the block 102. Alternatively, the block 106 can allow a user to select the next node to examine.

If the block 104 does not find a termination condition, a block 107 places each of the attributes in the characterization list into a context set identified for that node. The context set at each node is used to determine if an attribute is active within the context heuristics. The context set for a particular node (other than the root) includes: (1) the context set for the node from which the particular node branched (this node hereinafter referred to as the "previous node"); (2) any attribute identified in the characterization list by the block 102 for the particular node; and (3) the attribute chosen as the branch from the previous node to the particular node. The context set for the root of the induction tree contains only those attributes identified in the characterization list at the root of the induction tree.

The block 107 then partitions each active attribute into a finite number of value groups. Discrete attributes are partitioned into value groups according to discrete categories associated therewith. Real valued or continuous attributes are partitioned into value groups based on the actual values of that attribute within the current database and the classes associated with those values, as described hereinafter with respect to FIGS. 5A and 5B. The block 107 also determines whether the actual distribution of the classes among the value groups is consistent with the class heuristics defined for the attributes. If the block 107 discovers an inconsistency between the actual distribution of the classes among the value groups of an attribute and the distribution specified in the class heuristic, that attribute is marked with a disagreement flag.

Next, a block 108 calculates a FIGURE of merit, such as the normalized information gain value for each of the attributes active within the context heuristics, using the value groups developed by the block 107. The information gain value of an attribute is a measure of the distribution of the classes across the value groups of the attribute. The information gain value is defined such that a value of "1" indicates a complete or "perfect" correlation between the attribute value groups and the classes. In such a case, each attribute value group contains instances of only one class or is an empty set and, hence, the value groups completely discriminate the classes. Information gain values between "0" and "1" indicate less than complete correlation between the value groups and the classes, i.e., there is some distribution of classes among the value groups of the attribute. Information gain values close to "1" indicate a high correlation between the attribute value groups and the classes and information gain values close to "0" indicate a low correlation between the attribute value groups and the classes. An information gain value of "0" indicates that no correlation between the attribute value groups and the classes exists and thus, that the classes are randomly distributed throughout the value groups of the attribute. In such a case, the distribution of the classes is not affected by the selection of the attribute and so, selection of the attribute at the node would not be particularly helpful.

Preferably, the information gain value IG(A) of an attribute A is calculated as follows:

$$IG(A) = I(p,n) - E(A) \quad (1)$$

wherein:

$$I(p,n) = -\frac{p}{p+n} \log_2 \frac{p}{p+n} - \frac{n}{p+n} \log_2 \frac{n}{p+n} \quad (2)$$

and $$E(A) = \text{Expected value of attribute } A \quad (3)$$
$$= \sum_{i=1}^{vg} \frac{p_i + n_i}{p+n} \cdot I(p_i, n_i)$$

where:

p=Number of records within the current database associated with the first class; and n=Number of records within the current database associated with the second class;

and where:

vg=Total number of value groups associated with attribute A;

$p_i$=Number of records within the current database which are associated with the value group i of attribute A and which are associated with the first class;

$n_i$=Number of records within the current database with are associated with the value group i of attribute A and which are associated with the second class; and $I(p_i,n_i)$=I(p,n) calculated for $p=p_i$ and $n=n_i$;

Although the information gain value IG(A) is useful, it is biased toward those attributes which have a greater total number of value groups. Thus, an attribute having two value groups each with equal probability of having a particular class associated therewith will have an information gain value which is less than then the information gain value of an attribute having six value groups each with an equal probability of having a particular class associated therewith. To correct this bias, the following normalizing information gain value NG(A) for attribute A is calculated by the block 108:

$$NG(A) = \frac{IG(A)}{NF(A)} \quad (4)$$

where:

$$NF(A) = -\sum_{i=1}^{vg} \left[ \frac{p_i}{p_i+n_i} \log_2 \frac{p_i}{p_i+n_i} + \frac{n_i}{p_i+n_i} \log_2 \frac{n_i}{p_i+n_i} \right] \quad (5)$$

Next, a block 110 determines if any of the attributes active within the context heuristics have positive normalized information gain values. If none of the attributes has a positive normalized information gain value, the block 110 terminates further branching from the node and control passes to the blocks 105 and 106 which select the next node to be examined. If, however, one or more of the attributes have a positive normalized information gain value, a block 112 presents each of the attributes active within the context heuristics and the normalized information gain value associated therewith to the expert via the display 14 of FIG. 2.

Preferably, the attributes are ranked according to the normalized information gain values associated therewith. Such ranking may include the categories of: BEST, for the attribute having the highest normalized information gain value; HIGHLY USEFUL, for attributes having a normalized information gain value at least 95 percent of the highest normalized information gain value; USEFUL, for attributes having a normalized information gain value between 90 and 95 percent of the highest normalized information gain value; MARGINAL, for attributes having a normalized information gain value between 75 and 90 percent of the highest normalized information gain value; QUESTIONABLE, for attributes having a normalized information gain value between 50 and 75 percent of the highest normalized information gain value; LAST RESORT, for attributes having a normalized information gain value above zero but below 50 percent of the highest normalized information gain value; and USELESS, for attributes having a normalized information gain value of substantially zero. Any other desired categories can be alternatively or additionally used.

Preferably, any attribute which has been marked by the block 107 as having a distribution of classes among its value groups which is inconsistent with a class heuristic is identified as such by, for example, placing brackets around the displayed normalized information gain value of that attribute. Alternatively, the normalized information gain value of any such attribute can be set to zero.

The block 112 then permits selection of one of the attributes as a branch within the induction tree. Preferably, the block 112 allows the domain expert to interactively select one of the attributes which, also preferably, has a positive normalized information gain value. It is important to note, however, that the expert need not select the attribute having the highest normalized information gain value, but can select any of the attributes active within the context heuristics according to any desired criteria. Alternatively, the block 112 can automatically select one of the attributes and, in such a case, preferably selects the attribute with the highest normalized information gain value. However, automatic selection of an attribute may lead to a less complete or desirable solution.

A block 114 causes branching on the chosen attribute such that new nodes are created within the induction tree, each of which is constituted by a value group of the chosen attribute. A block 116 permits a user to interactively terminate or select each of the new nodes for examination, defines a new current database for each selected node and places the selected attribute into the context set for that node. The new current database includes all of the records within the database of the previous node having values associated with the value group of the new node. When one of the nodes has been selected, the block 116 stores an indication of the other nodes which were created by the block 114 and an indication of the databases and the context sets associated with those nodes for future examination in, for example, the data storage unit 16 of FIG. 2. The block 116 then returns to the block 102 which begins an iteration for the new node.

Figure 5A:
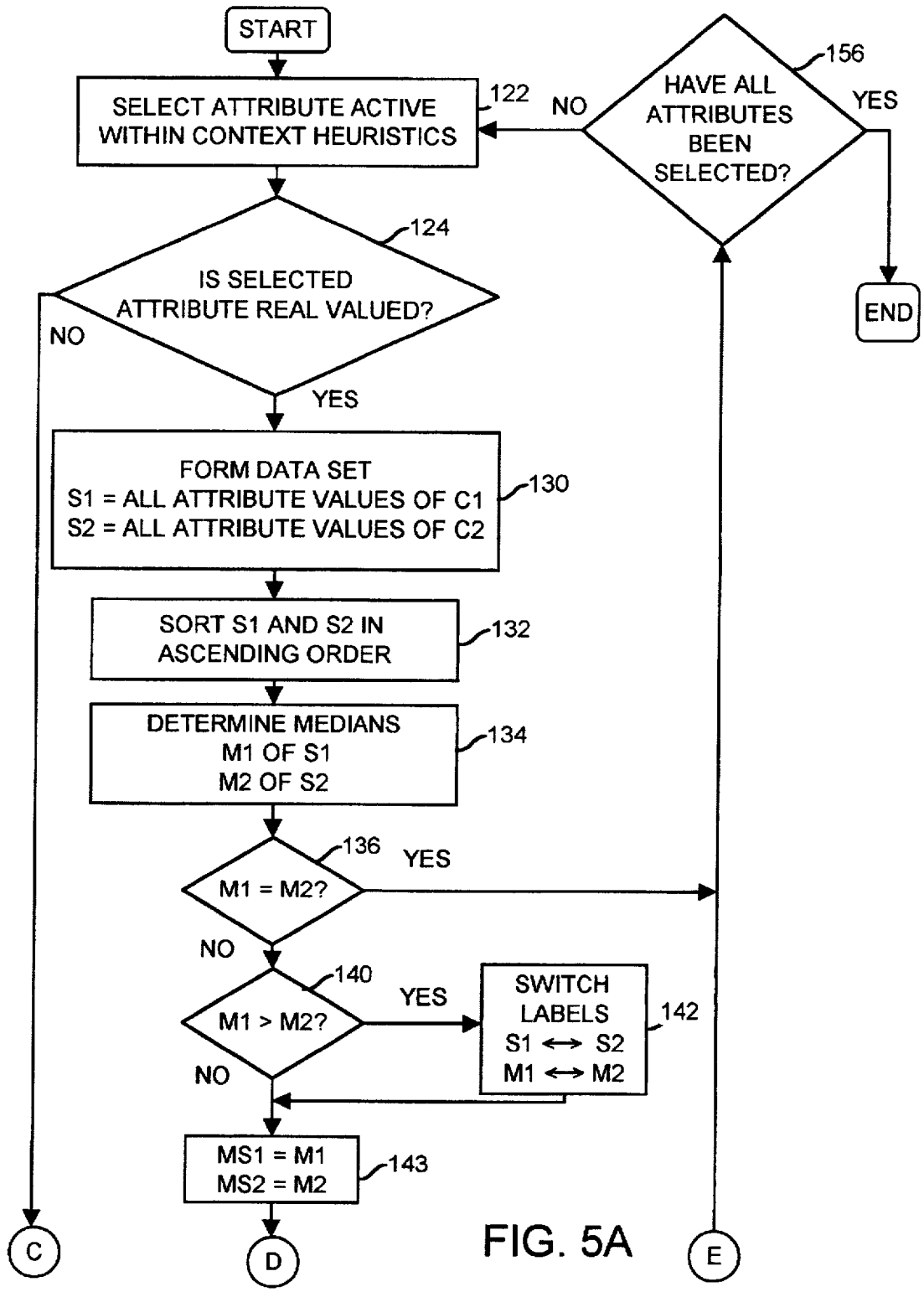
FIGS. 5A and 5B, when joined along similarly lettered lines, together comprise a flowchart of programming for implementing block 107 of FIG. 4.
Figure 5B:
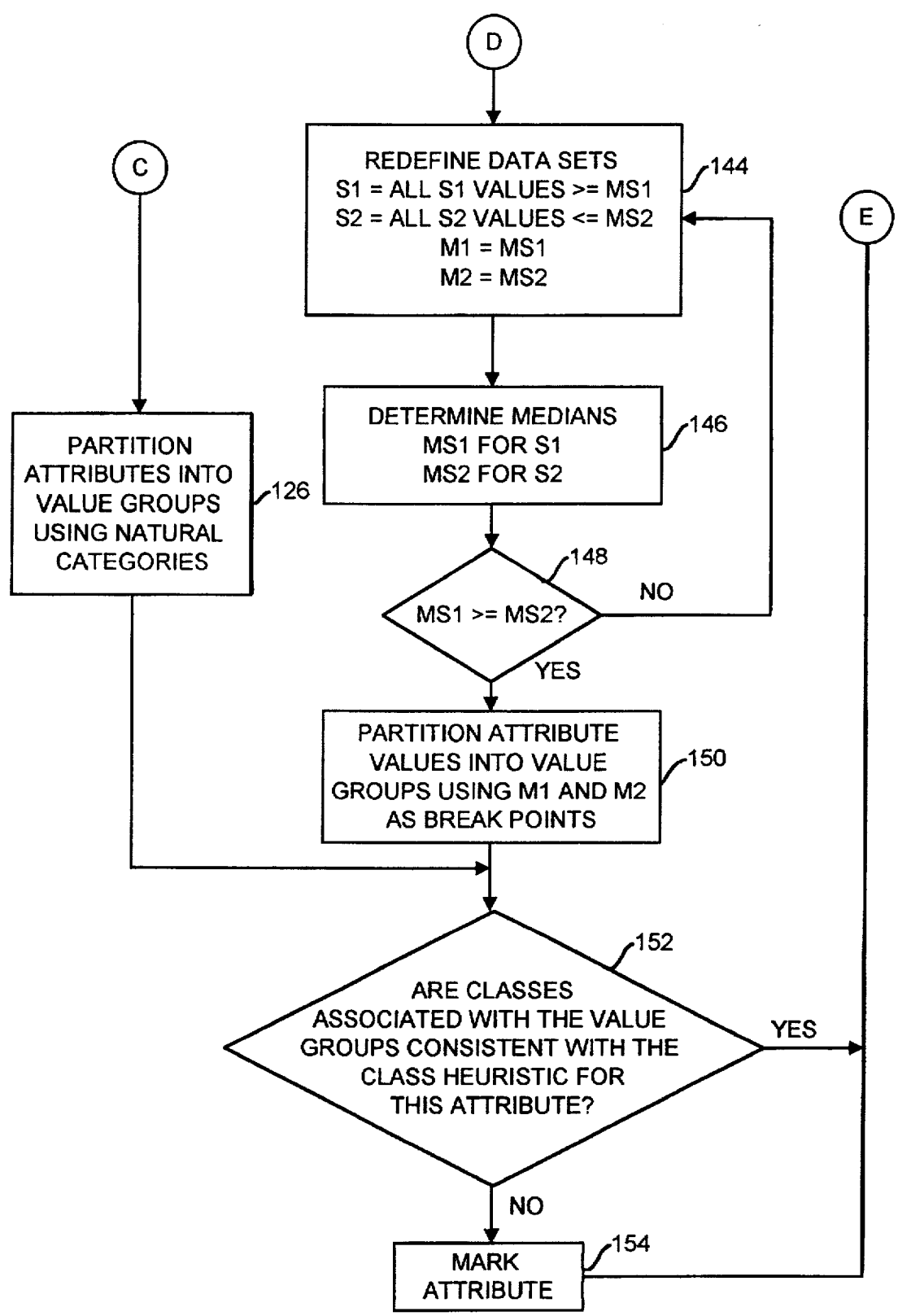

Referring now to FIGS. 5A and 5B, the operation of the block 107 of FIG. 4 will be described in detail. A block 122 selects a present attribute and determines whether the present attribute is active within the context heuristics. In doing so, the block 122 compares the context set for the node with a context list associated with the present attribute. The context list associated with the present attribute identifies those attributes which must be branched upon in the induction tree before the present attribute can become active. If all of the attributes within the context list associated with the present attribute are also within the context set of the node being examined, the present attribute is deemed to be active. If the present attribute has an empty context list it is always active within the context heuristics.

A block 124 then determines if the present attribute is real valued. If not, then the present attribute is a discrete valued attribute and a block 126 of FIG. 5B partitions the present attribute into value groups based on the categories associated with the present attribute which have been previously defined by the domain expert.

If the block 124 determines that the present attribute is real valued, a block 130 forms two data sets S1 and S2 from the values of the present attribute. The data set S1 includes all of the values of the present attribute in records within the current database associated the first class. The data set S2 includes all of the values of the present attribute in records within the current database associated with the second class.

A block 132 sorts all of the values within each of the data sets S1 and S2 in ascending order and a block 134 determines the medians M1 and M2 for the data sets S1 and S2, respectively. A block 136 determines whether the medians M1 and M2 are equal and, if so, the present attribute cannot be partitioned. Control is then passed to a block 156 and, as a result, the present attribute will only have one value group and the normalized information gain value associated therewith will be zero.

If, on the other hand, the medians M1 and M2 are not equal to one another, a block 140 tests to determine if the median M1 is greater than the median M2. If so, a block 142 relabels the data set S1 as data set S2 and the median M1 as median M2 and, simultaneously, relabels the data set S2 as data set S1 and the median M2 as median M1. Furthermore, the block 142 stores a class flag which indicates that the data sets S1 and S2 have been relabeled.

Next, a block 143 sets median values MS1 and MS2 equal to medians M1 and M2, respectively. A block 144 of FIG. 5B redefines the data set S1 to include only the values within the data set S1 which are greater than or equal to the median MS1. The block 144 also redefines the data set S2 to include only the values within the data set S2 which are less than or equal to the median MS2. Furthermore, the block 144 sets the medians M1 and M2 equal to the medians MS1 and MS2, respectively. A block 146 then determines the medians MS1 and MS2 of the new data sets S1 and S2, respectively. Next, a block 148 determines whether the median MS1 is greater than or equal to the median MS2 and, if not, control returns to the block 144 which redefines the data sets S1 and S2.

The blocks 144, 146 and 148 are reexecuted until the block 148 determines that the median MS1 is greater than or equal to the median MS2. When this condition occurs, a block 150 partitions the selected real valued attribute into three value groups. The first value group includes all of those attribute values associated with records within the current database which are less than or equal to M1. The second value group includes all of those attribute values associated with records within the current database which are greater than M1 and less than M2. The third value group includes all of those attribute values associated with records within the current database which are greater than or equal to M2. If desired, additional value groups can be defined by ranges at the upper and/or lower ends of the attribute value continuum which are associated exclusively with one class.

Although the blocks 134 and 146 are described herein as determining the medians of the sets S1 and S2, any other desired statistical properties of the sets S1 and S2, including the means thereof, could instead be determined and used in the method illustrated in the flowchart of FIGS. 5A and 5B. It should be noted that the above-described method of partitioning real valued attributes is computationally simple and inexpensive and, therefore, can be applied at every node of the induction tree which is labeled as a branching point.

A block 152 determines whether the distribution of the classes among the value groups developed by the blocks 126 and 150 is consistent with any class heuristics previously identified at the steps 38 or 62 of FIG. 3A. For real valued attributes, it is assumed that the first class is associated with the data set S1, meaning that proportionately more of the values within the data set S1 are associated with the first class than are associated with the second class. Likewise it is assumed that the second class is associated with the data set S2 such that proportionately more of the values within the data set S2 are associated with the second class than are associated with the first class. If, however, the class flag indicates that the data sets S1 and S2 have been relabeled during the discretization process, it is assumed that the first class is associated with the data set S2 and that the second class is associated with the data set S1.

With respect to real valued attributes, the block 152 determines if the class associated with the data set S1 or S2, as defined by the class flag, is consistent with the class heuristic. If so, the distribution of classes is said to be consistent with the class heuristic wherein the latter indicates whether higher or lower values of an attribute are expected to be associated with one of the classes. A class associated with the data set S1 is consistent with a class heuristic which indicates that lower values of the attribute are more likely to be associated with the class than higher values. Likewise a class associated with the data set S2 is consistent with a class heuristic which indicates that higher values of the attribute are more likely to be associated with the class than lower values of the attribute.

Preferably, for discrete valued attributes, a class heuristic indicates a value or value group of the attribute and the class which should be predominantly associated with that value group. Thus, for discrete valued attributes, the block 152 determines whether there is a higher or lower percentage of a class within the value group defined by the class heuristic than the percentage of that class in any other range of the attribute. For example, if the class heuristic identifies that one value group is more likely to be associated with the first class, the block 152 compares the percentage of values in the one value group which are associated with the first class to the percentage of the values of that attribute associated with the first class in each of the other value groups. If the percentage of values associated with the first class is highest in the one value group, the distribution of classes among the value groups is consistent with the class heuristic.

If the block 152 determines that the distribution of classes predominantly associated with the value groups of the attribute is inconsistent with the class heuristic identified for the attribute, a block 154 marks the attribute with a disagreement flag.

After the attribute has been marked by the block 154 or, if the block 152 does not detect an inconsistency between the distribution of the classes of the values within the value groups of the attribute and a class heuristic defined for the attribute, the block 156 of FIG. 5A determines if all of the attributes that are active within the context heuristics have been selected. If so, the method proceeds to the block 108 of FIG. 4. Otherwise, the block 122 selects the next attribute for partitioning.

The present invention has been used to minimize the incidence of a phenomenon called "banding" in a rotogravure printing system. During production of a cylinder used in the printing system, an image is engraved onto a copper cylinder. A coating of chrome is thereafter applied to the copper cylinder and the coated cylinder is proofed. After any necessary changes are made, the cylinder is placed on a printing press. During the printing process, the engraved cylinder is rotated in a bath of ink, excess ink is removed from the cylinder by a blade and a roll of paper is pressed against the cylinder with a rubber roller to transfer ink from the image engraved on the cylinder to the roll of paper.

Rotogravure printing presses typically include eight printing units. Four of the units print an image on one side of the paper and, after the paper is turned, the remaining four units print an image on the opposite side of the paper. One of each set of the four units is dedicated to each of the primary colors (blue, red, yellow) while the fourth is dedicated to black (key). By overlaying colors and black, any color can be reproduced.

When the paper exits the press, it is folded and cut to specified dimensions for inclusion in newspapers, magazines, books or other printed materials. After an order or job is completed, the engraved chrome image is removed from the copper cylinder and the copper cylinder is replated, allowing it to be engraved for another job.

Problems which cause delays can occur at any point within the rotogravure printing process, from the time that a copper cylinder is chrome plated to the time that the printed paper is folded and cut. One such delay results from cylinder "banding," which occurs as a result of grooves becoming engraved into the chrome plated cylinder surface during the printing process. These grooves collect ink and cause bands or streaks to be printed onto the roll of paper and ruin the final printed product.

Once a band appears in an image cylinder, the printing press must be shut down and a technician must remove the band by polishing it out of the cylinder. If the band has also created a groove in the copper sub-surface of the cylinder, the cylinder must be taken to a plating station where the chrome surface is removed, the band is polished out of the copper sub-surface and the cylinder is replated. A cylinder band causes anywhere from one-half of an hour to six or more hours of delay in a particular printing press job. Delays caused by banding must generally be made up on weekends, requiring overtime pay for an eight to twelve person crew necessary for each printing job.

Although the prevention of cylinder banding has been pursued many times, the approaches usually included trial and error methods of adjusting printing control features. Typically, some of these approaches were successful in decreasing the incidence of banding initially, but banding usually reappeared later with very little indication as to the cause of the reappearance.

In applying the present invention to the problem of cylinder banding, it was necessary to define all possible attributes which could affect the probability of banding occurring and not occurring. The attributes identified as potentially relevant to the problem of cylinder banding within a rotogravure printing process are listed below with an indication of the range and units of each attribute (if continuous) and with an indication of whether each attribute is discrete or real valued.

| ATTRIBUTE | RANGE | UNITS [TYPE] |
| --- | --- | --- |
| Roughness | 0–0.5 | microns [continuous] |
| Anode_Distance | 0–100 | millimeters [continuous] |
| Chrome_Solution_Ratio | 0–200 | chromic acid/sulfuric acid [continuous] |
| Current_Density | 0–200 | amps/sq. decimeter [continuous] |
| Plating_Tank | 1910, 1911, Other | none [discrete] |
| Viscosity | 0–30 | seconds [continuous] |
| Proof_Press_Cut | 0–100 | percentage [continuous] |
| Proof_on_Coated_Ink | Yes, No | none [discrete] |
| Humidity | 0–100 | percentage [continuous] |
| Ink_Temperature | 0–120 | degrees Fahrenheit [continuous] |
| Blade_Stroke | 0–2 | inches |

-continued

| ATTRIBUTE | RANGE | UNITS [TYPE] |
|---|---|---|
| Blade_Pressure | 0–100 | pounds/sq. inch [continuous] |
| Type_on_Cylinder | Yes, No | none [discrete] |
| Blade_Mfr. | Benton, Udeholm, Daetwyler | none [discrete] |
| Cylinder_Division | Spartanburg, Gallatin, Warsaw, Chicago, Mattoon | none [discrete] |
| Varnish_Percentage | 0–100 | percentage [continuous] |
| Ink_Percentage | 0–100 | percentage [continuous] |
| Solvent_Percentage | 0–100 | percentage [continuous] |
| Press_Speed | 0–4000 | feet/minute [continuous] |
| Paper_Type | Super, Uncoated, Coated | none [discrete] |
| Ink_Type | Coated, Uncoated, Cover | none [discrete] |
| Steam_Bar | On, Off | none [discrete] |
| Solvent_Type | Line, Lactol, Xylol, Naptha, Other | none [discrete] |
| Grain_Screened | Polishing Paper, Etched, No | none [discrete] |
| Press | TR821, TR802, TR813, TR824, TR815, TR816, TR827, TR828 | none [discrete] |
| Wax | 0–100 | gallons/shift [continuous] |
| Hardener | 0–100 | gallons/shift [continuous] |
| Unit_Number | 0, . . . , 10 | none [discrete] |
| ESA_milliamps | 0–5 | milliamps [continuous] |
| ESA_kilovolts | 0–5 | kilovolts [continuous] |
| Cylinder_Size | catalog, spiegel, tabloid | none [discrete] |
| Mill_Location | Northern U.S., Southern U.S., Scandinavia, Canada, Mid-Europe | none [discrete] |
| Basis_Weight | 0–120 | lbs./ream [continuous] |

The foregoing terms are defined/explained as follows:

| | |
|---|---|
| Roughness | a measure of the surface roughness of the chrome plated printing cylinder; |
| Anode_Distance | the distance that a plating anode is placed away from the copper cylinder during chrome plating thereof; |
| Chrome_Solution_ sulfuric Ratio | the ratio of chromic acid to acid within the chrome solution; |
| Current_Density | the density of the current across the cylinder surface during chrome plating thereof; |
| Plating_Tank | an identifying number of the plating tank used to hold the chrome solution into which the copper printing cylinder is immersed during chrome plating thereof; |
| Viscosity | the viscosity of the ink used in the printing process; |
| Proof_Press_Cut | the ratio of clear varnish to pigment within the ink used during the proofing process; |
| Proof_on_ proofing Coated_Ink | an indication of whether the process was performed using a particular ink; |
| Humidity | the humidity of the pressroom; |
| Ink_Temperature | the temperature of the ink applied to the printing cylinder during the printing process; |
| Blade_Stroke | the oscillation stroke length of the blade which wipes excess ink from the printing cylinder; |
| Blade_Pressure | the pressure of the blade against the printing cylinder when the blade wipes ink from the printing cylinder; |
| Type_on_Cylinder | an indication of whether the cylinder is to be used only for printing type; |
| Blade_Mfr. | the manufacturer of the particular blade used to wipe ink from the printing cylinder; |
| Cylinder_Division | the company division which produced the chrome plated printing cylinder; |
| Varnish_Percentage | the percentage of varnish in the printing ink; |
| Ink_Percentage | the percentage of pigment in the printing ink; |
| Solvent_Percentage | the percentage of solvent in the printing ink; |
| Press_Speed | the speed of the paper roll past the printing cylinder during the printing process; |
| Paper_Type | the commercial type of paper used during the printing process; |
| Ink_Type | the type of pigment used in the printing ink; |
| Steam_Bar | an indication of whether a steam bar was used to produce a mist near the cylinder during the printing process; |
| Solvent_Type | the type of solvent used during the printing process; |
| Grain_Screened | an indication of whether the cylinder has had a groove etched into the ends thereof for the purpose of carrying ink; |
| Press | the type of press used during the printing process; |
| Wax | the amount of wax mixed with the printing ink; |
| Hardener | the amount of hardener added to the printing ink; |
| Unit_Number | the unit number of the press used during the printing process; |
| ESA_milliamps | the current delivered to an electrostatic assist which creates a static charge near the printing cylinder during the printing process; |
| ESA_kilovolts | the voltage of the electrostatic assist used during the printing process; |
| Cylinder_Size | the nominal circumference of the printing cylinder; |
| Mill_Location | the location of the paper mill which produced the paper used during the printing process; and |
| Basis_Weight | a measurement of the weight of the paper used during the printing process. |

The following list of class heuristics and context heuristics were identified for the above-described attributes.

| ATTRIBUTE | CLASS HEURISTIC | CONTEXT HEURISTIC |
|---|---|---|
| Roughness | None | |
| Anode_Distance | Lower values - likely to band | |
| Chrome_Solution_Ratio | Lower values - likely to band | |
| Current_Density | Lower values - likely to band | |
| Plating_Tank | None | |
| Viscosity | Lower values - likely to band | |
| Proof_Press_Cut | Lower values - likely to band | |
| Proof_on_Coated_Ink | Higher values - likely to band | |
| Humidity | Lower values - likely to band | |
| Ink_Temperature | Higher values - likely to band | |
| Blade_Stroke | Lower values - likely to band | |
| Blade_Pressure | Higher values - likely to band | Use only after Press |
| Type_on_Cylinder | None | |
| Blade_Mfg. | None | |
| Cylinder_Division | None | |
| Varnish_Percentage | None | |
| Ink_Percentage | None | |
| Solvent_Percentage | None | |
| Press_Speed | None | |
| Paper_Type | None | |
| Ink_Type | None | |
| Steam_Bar | Off - Likely to band | |
| Solvent_Type | None | |
| Grain_Screened | No - Likely to band Yes - Not likely to band | |
| Press | None | |
| Wax | None | |
| Hardener | None | |
| Unit_Number | None | |
| ESA_milliamps | None | |
| ESA_kilovolts | None | |
| Cylinder_Size | None | |
| Mill_Location | None | |
| Basis_Weight | None | |

Data was collected for 454 press runs to produce 454 records, each having a value for each of the above-identified attributes and an indication of the class of the run (i.e., Banded or No_Band). Data collected during the printing process were typically recorded at a time that a press run was labeled with the class Banded, i.e., when a band was detected, or sometime during or at the end of a press run which was ultimately labeled with the class No-Band.

One problem with labeling any particular run as within the class No_Band arose because some printing runs are shorter than other printing runs and it is difficult, if not impossible, to determine if a short printing run would have banded had the run been longer. It was noted, however, that printing runs which banded tended to do so before one million impressions were made during the run. As a result of this observation, it was determined that runs over one million impressions that did not ultimately band were in the No_Band class and runs which banded at any time, including runs which printed fewer than one million impressions, were in the Banded class. However, those runs which ran for fewer than one million impressions and did not band were in an indeterminate class and data therefrom were not used.

Using the 454 records, the above-described program was implemented on a computer to interactively construct a number of induction trees, a portion 190 of one of which is illustrated in FIGS. 6A to 6F. Generally, the root and each node of the induction tree 190 are indicated by trapezoidal boxes. Furthermore, the summaries (including characterization lists) produced at each node are indicated by rectangular boxes while branches emanating from a node are indicated by six-sided boxes.

Figure 6A:
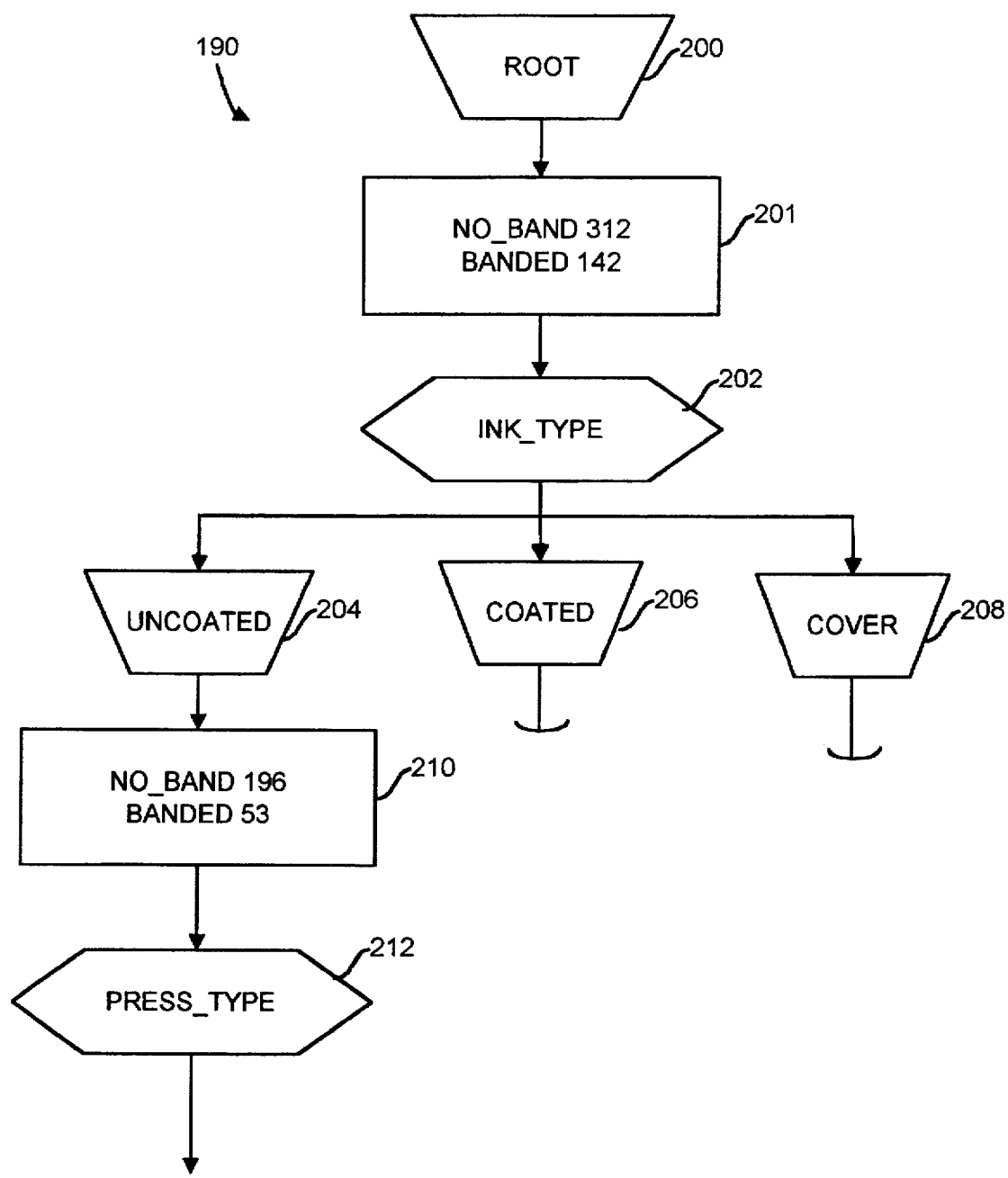
FIGS. 6A–6F together illustrate a portion of an induction tree constructed according to the method of the present invention for the problem of cylinder banding in a rotogravure printing process.

Referring now to FIG. 6A, the induction tree 190 includes a root 200. A summary box 201 indicates that of the 454 records within the current database at the root 200, 312 of the records are associated with the No_Band class while 142 of the records are associated with the Banded class. At the time that the induction tree 190 was constructed, the normalized information gain values were computed for each attribute active within the context heuristics and the user was presented with a list of the attributes active within the context heuristics and the normalized information gain values associated therewith. In the case shown in FIGS. 6A–6F, the user chose the attribute Ink_Type as a first branch 202 of the induction tree 190. The attribute Ink_Type had three value groups associated therewith, i.e., Uncoated, Coated and Cover, which are identified as nodes 204, 206 and 208, respectively.

At the node 204, the current database included 249 records comprising the records within the database at the root 200 having an Ink_Type value of Uncoated. A summary block 210 indicates that 196 records were associated with the class No_Band and 53 records were associated with the class Banded.

Figure 6B:
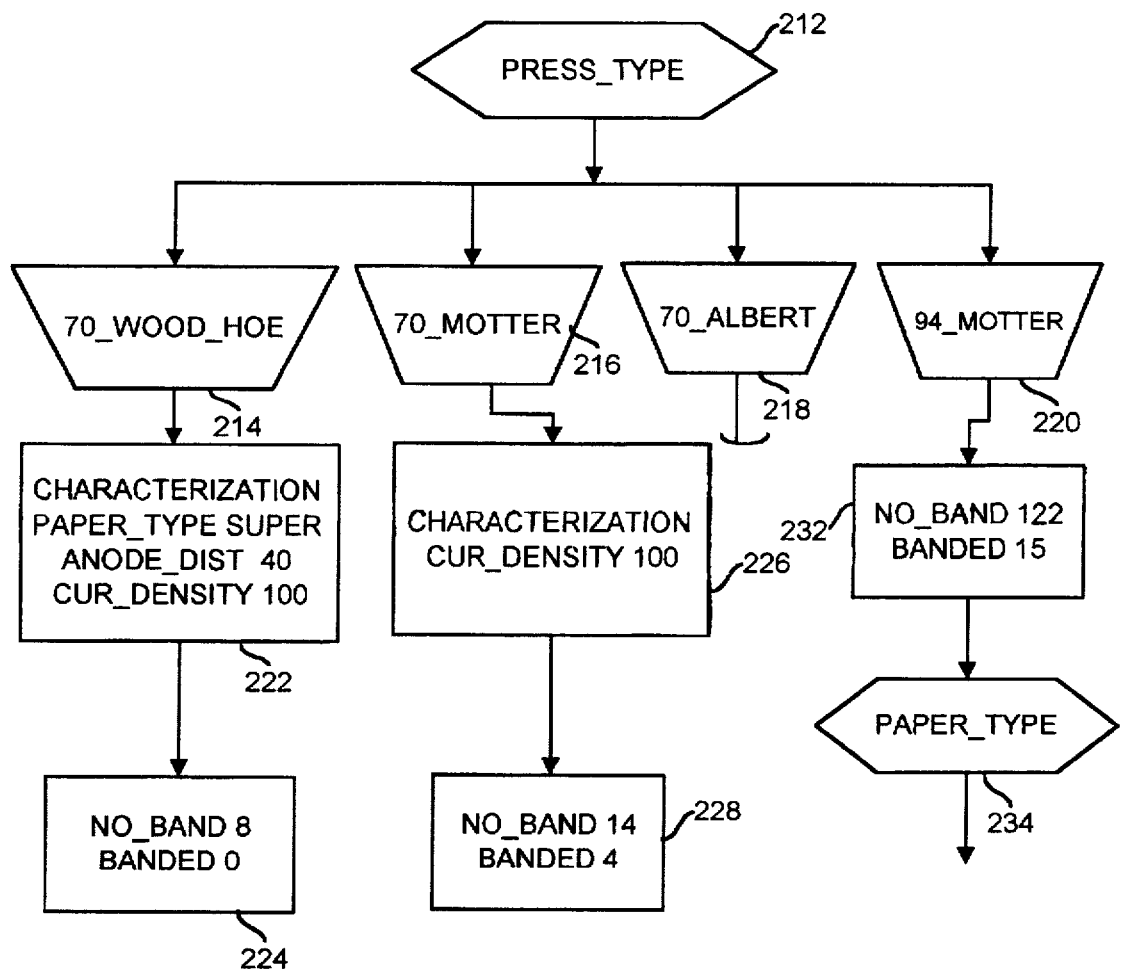

Following the node 204, the attribute Press_Type was selected as a branch 212. Referring now to FIG. 6B, the attribute Press_Type was divided into four discrete value groups which are identified as four new nodes 214, 216, 218 and 220. The node 214 was selected and a summary block 222 indicates that all of the records within the current database at the node 214 were characterized as having the value of Super for the attribute Paper_Type, the value of 40 for the attribute Anode_Distance and the value of 100 for the attribute Current_Density. The summary block 224 indicates that all eight of the values within the current database at the node 214 were associated with the No_Band class. As a result, the node 214 is an endpoint of the induction tree 190 and no further branching took place therefrom.

The node 216 was then chosen as the next node to examine. A summary block 226 provides a characterization list indicating that all of the records within the current database at the node 216 were characterized as having a value of 100 for the attribute Current_Density. This characterization list indicates to the user that the attribute therein, i.e., Current_Density, will have a normalized information gain value of "0" at any node which branches from the node 216. A summary block 228 indicates that 14 of the records within the current database were associated with the No_Band class while four of the records were associated with the Banded class. At this point either branching from the node 216 was manually terminated or none of the attributes active within the context heuristics had a non-zero normalized information gain value. As a result, the programming branched on the node 218. For the sake of clarity, the portion of the induction tree 190 depending from the node 218 is not shown.

After the program constructed the portion of the induction tree 190 associated with the node 218, the node 220 was chosen as the next node to examine. The summary block 232 indicates that 122 of the records within the current database were associated with the No_Band class while 15 records were associated with the Banded class.

Figure 6C:
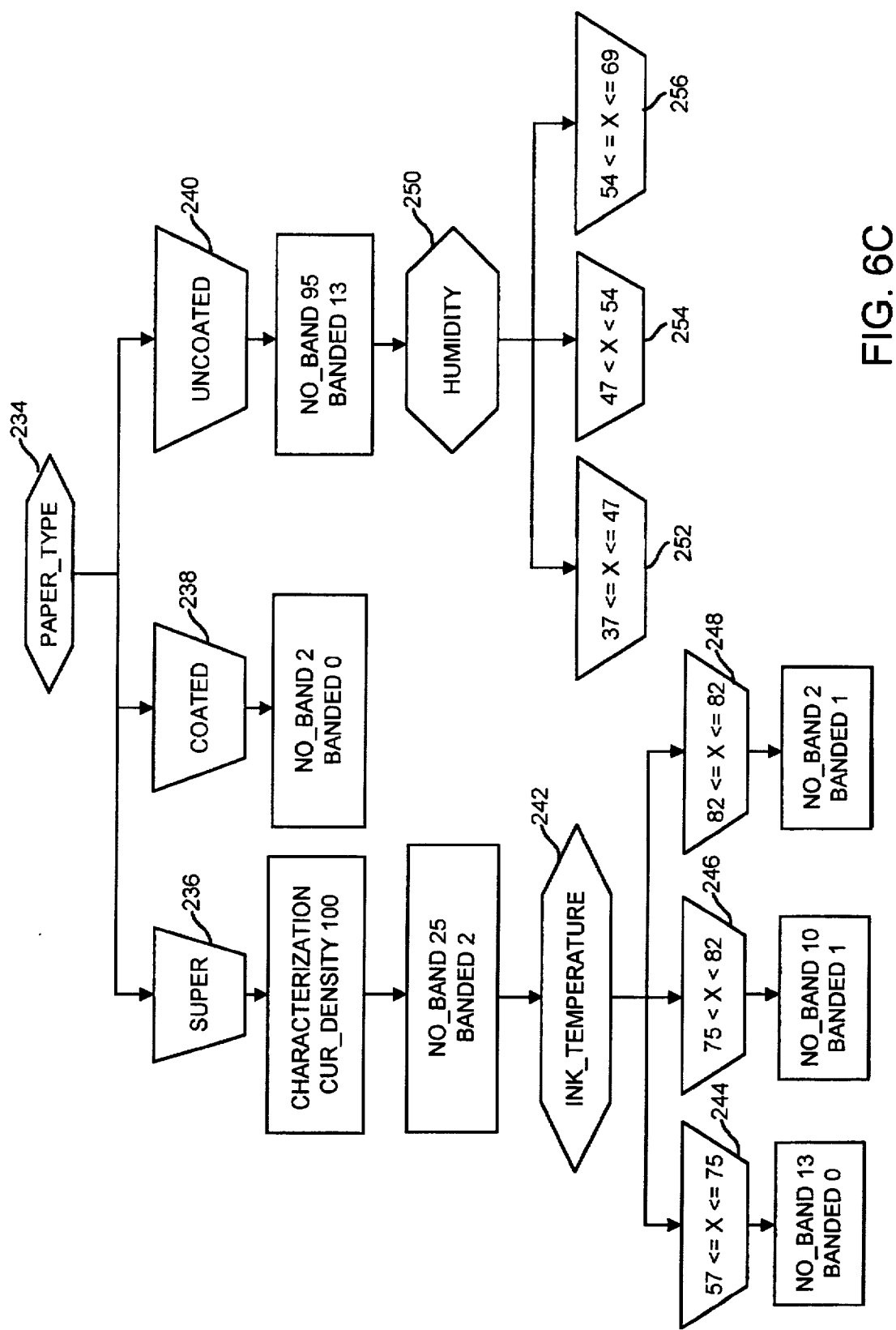

The attribute Paper_Type was then selected as a branch 234. Referring now to FIG. 6C, the attribute Paper_Type was partitioned into three discrete value groups which are identified as nodes 236, 238 and 240.

The attribute Ink_Temperature was chosen as a branch 242 from the node 236. The attribute Ink_Temperature, which is a continuous attribute, was partitioned into three value groups, i.e., ink temperatures lower than or equal to 75 degrees, ink temperatures between 75 degrees and 82 degrees, and ink temperatures greater than or equal to 82 degrees. These value groups are identified as nodes 244, 246 and 248, respectively. The node 244 is an endpoint of the induction tree 190 because all of the records in its current database are associated with the class No_Band.

Figure 6D:
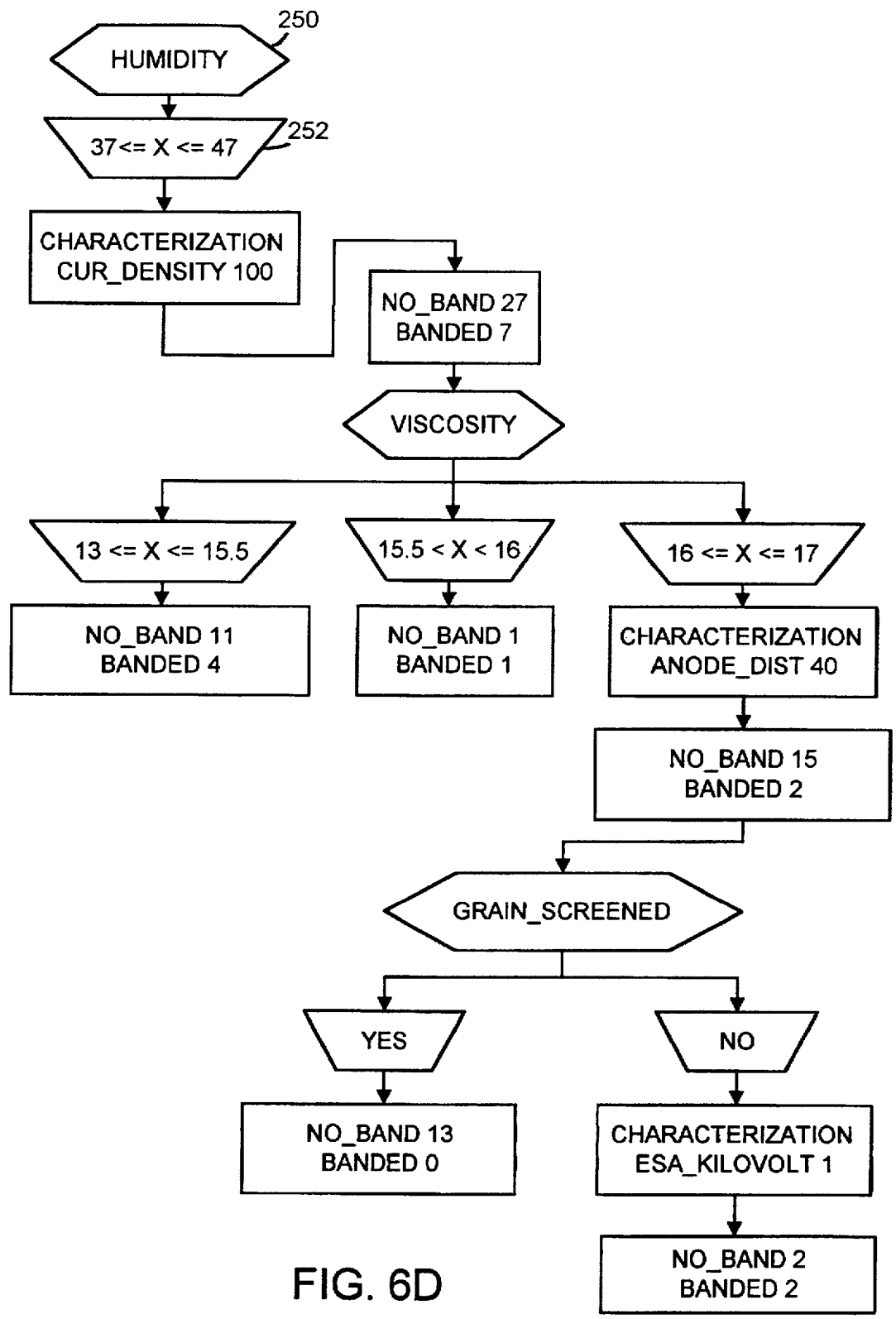
Figure 6E:
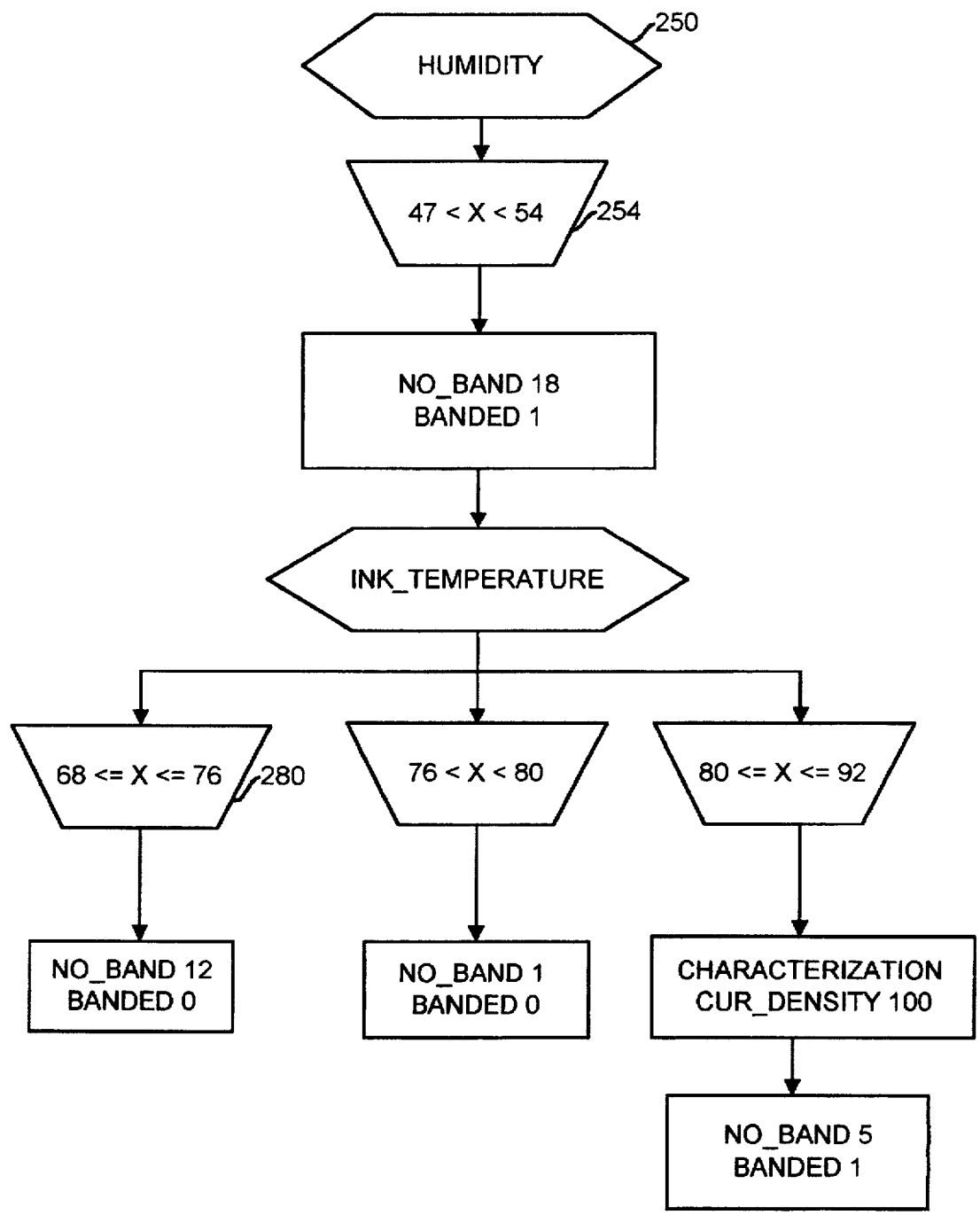

Next, the program identified the node 238 as an endpoint of the induction tree 190 and selected the node 240 as the next node. At the node 240, the real valued attribute Humidity was chosen as a branch 250 and was partitioned into three value groups which are identified as nodes 252, 254 and 256. The portions of the induction tree 190 associated with the nodes 252 and 254 are illustrated in FIGS. 6D and 6E respectively, and were developed in the same manner as described with respect to the portions of the induction tree 190 illustrated in FIGS. 6A, 6B and 6C.

Figure 6F:
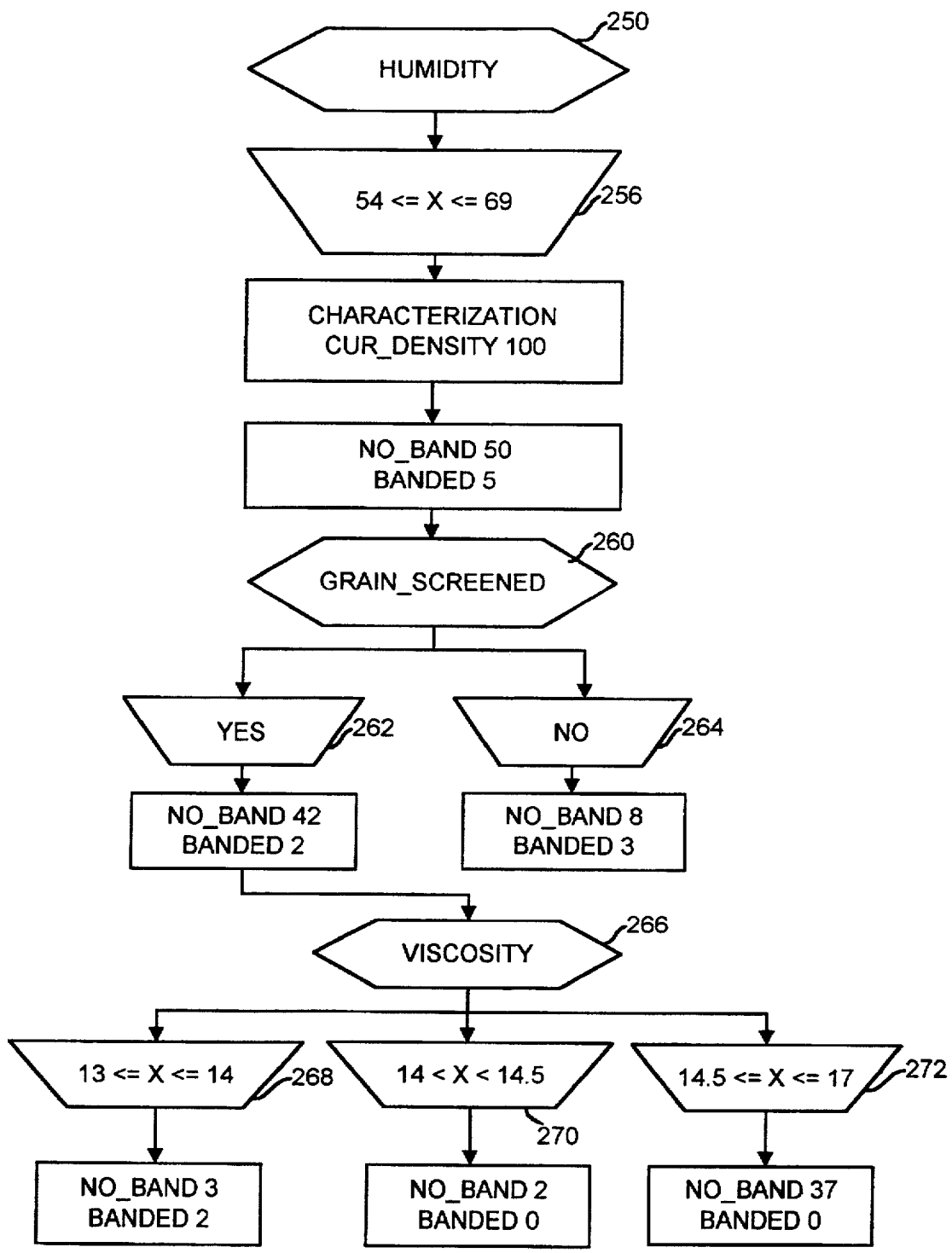

Referring now to FIG. 6F, which illustrates the portion of the induction tree 190 associated with the node 256, the attribute Grain_Screened was selected as a branch 260 and was partitioned into two value groups which are identified as nodes 262 and 264.

The real valued attribute Viscosity was chosen as a branch 266 from the node 262 and was partitioned into three value groups which were identified as the nodes 268, 270 and 272. The nodes 270 and 272 are endpoints of the induction tree 190.

After constructing the induction tree 190, an expert decomposed the induction tree 190 by selecting paths within the induction tree 190 to use as solution components. These solution components were placed in a solution list and implemented to reduce the incidence of cylinder banding.

Referring to FIG. 6F, the path including the nodes 272 and 262 suggests that Viscosity above 14.5 in a run in which the attribute Grain_Screened is present reduces the likelihood that cylinder banding will occur. Thus, elements Viscosity above 14.5 and Grain_Screened may be added to the solution list as favorable conditions to reduce the probability of banding.

Referring to FIG. 6E, a further path including nodes 280 and 254 indicates that Ink_Temperature below 76 degrees and Humidity between the values of 47 and 54 percent reduce the incidence of cylinder banding. As seen in FIG. 6C, a still further path including nodes 244 and 236 indicates that when Ink_Temperature is below 75 degrees and the value of the attribute Paper_Type is Super, the incidence of banding is reduced. Relevant paths within an induction tree proceed directly between the root of the induction tree and an endpoint, include any number of nodes and can start or end at any point.

After creation of the induction tree shown in part in FIGS. 6A–6F, other induction trees were constructed in a similar manner. The expert then reviewed some or all of the induction trees to identify paths therein until he felt confident that enough solution components had been identified to reduce the incidence of banding.

The solution which was developed from the induction trees is given in the chart below in which the expert indicated three ranges of each of a number of relevant attributes. The indications or categories "favorable", "neutral" and "unfavorable" designate attribute ranges with respect to the class No_Band. The number of ranges identified by a solution is not limited to three, but can instead be any desired number.

| ATTRIBUTE | FAVORABLE | NEUTRAL | UN-FAVORABLE |
|---|---|---|---|
| Humidity (Pressroom) | above 54% | between 54% and 46% | below 46% |
| Grain_Screened | Etched | w/Polishing Paper | None |
| Anode_Distance (Plating Tank) | at or above 40 mm | between 40 mm and 37 mm | below 37 mm |
| Chrome Solution | above 103 | between 103 and 100 | below 100 |
| Roughness | at or below .267 | between .267 and .300 | above .300 |
| Ink Temperature | below 75° F. | between 75° F. and 80° F. | above 80° F. |
| Viscosity | above 16 seconds | between 16 and 15 seconds | below 15 seconds |
| Blade_Stroke | more than .75 in. | between .75 in. and .625 in. | less than .625 in. |
| Current Density (Plating Tank) | at or above 100 amperes per square decimeter | — | at or below 90 amperes per square decimeter |
| Blade_Pressure Press Group | (varies with press or press group) | | |
| TR802 | less than 46 lbs | between 46 and 50 lbs | more than 50 lbs |
| TR813 | manual system, no values available | | |
| Alberts (TR815 TR816) | less than 28 lbs | between 28 and 30 lbs | more than 30 lbs |
| TR821 | less than 20 lbs | between 20 and 25 lbs | more than 25 lbs |
| 94_Motter (TR824 TR827 TR828) | less than 20 lbs | between 20 and 30 lbs | more than 30 lbs |

A review of the induction trees indicated, in general, that if the rotogravure printing process from which the data were obtained is run with two or more values of attributes within the unfavorable region, the probability of the occurrence of a cylinder band increases significantly. Furthermore, the more values of attributes that fall within the favorable ranges, the higher the probability that a run will not band.

It should be noted that, although the solution indicated above reduced cylinder banding at the particular plant for which the data was taken, it is unlikely that the same solution would work with the same degree of success at other printing plants. Although the same solution may be transferable to some extent from one plant to another, the best solution for a particular plant can likely only be identified by performing the method and system of the present invention using data from the particular plant.

Furthermore, although the method and system have been described as being used for the problem of banding within a printing process, it should be noted that the same method and/or system can be used to solve other problems within the printing process, such as web breaks. Moreover, the method and system can be generally applied to any production process or assembly line operation with multiple outputs, some of which can be defective when measured against a table of requirements. Thus, for example, the method can be applied to, but is not limited to, automotive assembly, paper making, drug manufacturing, microprocessor production, and an ink/paint/adhesive manufacturing process.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications, which are within the scope of the appended claims, is reserved.

It is claimed:

1. A system for use in developing an indication of a cause of a particular result of a process from values each associated with one of a first plurality of attributes arising during an associated one of a second plurality of runs of the process, wherein the runs during which the particular result occurred are in a first class and the runs during which the particular result did not occur are in a second class, comprising:

- data entry means for permitting a user to enter data indicating the attribute values and the class associated with each of the second plurality of runs;
- a memory for storing the data indicating the attribute values and the class associated with each of the second plurality of runs;
- a processing unit including,
  - means for dividing the values associated with each of the attributes into value groups including means for determining whether an actual distribution of classes among the value groups of a certain one of the attributes is consistent with a class heuristic which indicates an expected distribution of classes among the value groups of the certain one of the attributes,
  - means for selecting any one of the first plurality of attributes,
  - means for designating a value group of the selected attribute as an endpoint of an induction tree when the value group satisfies an endpoint criterion and, otherwise, designating the value group of the selected attribute as a branching point of the induction tree,
  - means operative when a value group of the selected attribute is designated as a branching point for redividing the values associated with attributes other than the selected attribute into further value groups,
  - means operative when a value group of the selected attribute is designated as a branching point and coupled to the redividing means for choosing a further attribute, and
  - further means coupled to the choosing means for determining whether any further value group of the further attribute satisfies the endpoint criterion and thus comprises an endpoint of the induction tree; and
- an output device which develops a representation of the induction tree for the user.

2. The system of claim 1, wherein the designating means comprises means for ascertaining whether a predetermined percentage of the runs during which the values within the value group arose are associated with one of the first and second classes.

3. The system of claim 1, further including means for calculating figures of merit for attributes from the value groups of the attributes and wherein the selecting means includes means for allowing a user to select any one of the first plurality of attributes and means for indicating the figures of merit to the user prior to allowing the user to select any one of the first plurality of attributes.

4. The system of claim 1, wherein a value group designated as a branching point contains a certain number of values which are associated with a certain number of runs and wherein the redividing means redivides the values associated with attributes other than the selected attribute and associated with the certain number of runs.

5. The system of claim 1, wherein the selecting means includes means for allowing a user to select any one of the first plurality of attributes and means for notifying a user when the actual distribution of classes among the value groups of the certain one of the attributes is inconsistent with the class heuristic.

6. The system of claim 1, wherein the values associated with a particular one of the attributes are in a continuum and wherein the dividing means divides the continuum into a set of ranges such that each value group associated with the particular one of the attributes includes the values within one of the ranges.

7. The system of claim 6, wherein the dividing means includes means for separating the values of the particular one of the attributes into first and second sets according to the classes of the runs during which the values arose, first means for measuring a statistical property of the first set, second means for measuring a statistical property of the second set and means for developing the set of ranges from the statistical properties of the first and second sets.

8. The system of claim 7, wherein the developing means includes means for deriving first and second subsets of values from the first and second sets wherein the first subset includes the values of the first set which are greater than the statistical property of the first set and the second subset includes the values of the second set which are less than the statistical property of the second set, means for finding a statistical property of the first and second subsets, means coupled to the deriving means for replacing the statistical properties of the first and second sets with the statistical properties of the first and second subsets, respectively, if the statistical property of the first subset is less than the statistical property of the second subset, and means coupled to the deriving means and operable when the statistical property of the first subset is greater than or equal to the statistical property of the second subset for defining a first range having a region below the statistical property of the first set, a second range having a region between the statistical property of the first set and the statistical property of the second set and a third range having a region above the statistical property of the second set.

9. The system of claim 8, wherein the statistical property of the first set is the same as the statistical property of the second set.

10. The system of claim 8, wherein the statistical property of one of the first and second sets is a median.

11. The system of claim 1, wherein the data entry means is a keyboard.

12. The system of claim 1, wherein the data entry means is a disk drive.

13. The system of claim 8, wherein the certain one of the attributes is different than the particular one of the attributes.

14. The system of claim 1, further including means for calculating figures of merit for attributes from the value groups of the attributes and wherein the selecting means selects the one of the first plurality of attributes based on the figures of merit.

15. The system of claim 1, wherein the selecting means includes means for allowing a user to select any one of the first plurality of attributes and the choosing means includes means for permitting a user to select the further attribute.

16. The system of claim 1, wherein the selecting means inhibits selection of the certain one of the attributes as the selected attribute when the actual distribution of classes among the value groups of the certain one of the attributes is inconsistent with the class heuristic.

17. An apparatus for constructing an induction tree having a plurality of nodes which is for use in determining a cause of a particular result of a process from a data set including values for each of a first plurality of attributes arising during each of a second plurality of runs of the process and an indication of a class associated with each of the second plurality of runs, wherein the runs during which the particular result occurred are in a first class and the runs during which the particular result did not occur are in a second class, comprising:

data entry means for permitting a user to enter the data set;

a memory for storing the data set;

a processing unit including,
means for dividing the values within the data set and associated with each of the first plurality of attributes into value groups at each of a third plurality of the nodes, wherein a class heuristic defining an expected distribution of classes among value groups of a certain one of the attributes is identified and wherein the dividing means includes means for determining whether an actual distribution of classes among the value groups of the certain one of the attributes is consistent with the class heuristic, means coupled to the dividing means for allowing a user to select one of the first plurality of attributes at each of the third plurality of the nodes, means coupled to the allowing means for designating one of the value groups of the selected attribute as an endpoint of the induction tree when the one of the value groups satisfies an endpoint criterion and, otherwise, designating the one of the value groups of the selected attribute as a branching point of the induction tree, wherein the value group designated as a branching point contains a certain number of values associated with a certain number of runs, and means coupled to the designating means and to the dividing means and operable when a value group of the selected attribute has been designated as a branching point for redefining the data set to include the values associated with the certain number of runs, and an output device which develops a representation of the induction tree for the user.

18. The apparatus of claim 17, wherein the endpoint criterion is satisfied when a predetermined percentage of the runs during which the values within the value group being designated arose are associated with one of the first and second classes.

19. The apparatus of claim 17, further including means for calculating a figure of merit for attributes at each of the third plurality of the nodes from the value groups of the attributes and wherein the allowing means includes means for indicating the figures of merit to a user.

20. The apparatus of claim 17, further including means for inhibiting the allowing means from allowing a user to select the certain one of the attributes as the selected attribute when the actual distribution of classes among the value groups of the certain one of the attributes is inconsistent with the class heuristic.

21. The apparatus of claim 17, wherein the allowing means includes means for notifying a user when the actual distribution of classes among the value groups of the certain one of the attributes is inconsistent with the class heuristic.

22. The apparatus of claim 17, wherein the values associated with a particular one of the attributes are in a continuum and the dividing means divides the continuum into a set of ranges such that each value group associated with the particular one of the attributes includes the values within one of the ranges.

23. The apparatus of claim 22, wherein the dividing means includes means for separating the values associated with the particular one of the attributes into first and second sets according to the classes of the runs during which the values arose, means for finding statistical properties of the first and second sets and means for developing the set of ranges from the statistical properties of the first and second sets.

24. The apparatus of claim 23, wherein the developing means includes means for deriving first and second subsets of values from the first and second sets, wherein the first subset includes the values of the first set which are greater than the statistical property of the first set and the second subset includes the values of the second set which are less than the statistical property of the second set, means for measuring statistical properties of the first and second subsets, means for replacing the statistical properties of the first and second sets with the statistical properties of the first and second subsets, respectively, if the statistical property of the first subset is less than the statistical property of the second subset, and means coupled to the deriving means and operable when the statistical property of the first subset is greater than or equal to the statistical property of the second subset for defining a first range having a region below the statistical property of the first set, a second range having a region between the statistical property of the first set and the statistical property of the second set and a third range having a region above the statistical property of the second set.

25. The apparatus of claim 24, wherein the statistical property of one of the first and second sets is a median.

26. The apparatus of claim 24, wherein the certain one of the attributes is different than the particular one of the attributes.

27. The system of claim 17, wherein the data entry means is a keyboard.

28. The system of claim 17, wherein the data entry means is a disk drive.

29. A method of forcing a repetitively-executed process toward a particular outcome, comprising the steps of:

determining attributes which potentially affect the outcome;

collecting attribute data indicative of each attribute during a number of prior runs of the process;

obtaining outcome data indicative of the outcome of each prior process run;

building an induction tree from the collected attribute data and the obtained outcome data including dividing the attribute data into value groups and determining whether an actual distribution of outcomes associated with the attribute data in the value groups of a certain one of the attributes is consistent with a class heuristic defining an expected distribution of outcomes among the attribute data of the values groups of the certain one of the attributes;

finding a path in the induction tree which indicates that the particular outcome is more likely to occur than not; and using the found path to specify attribute values for a subsequent run of the process.

30. The method of claim 29, wherein the induction tree comprises a plurality of nodes and the step of building the induction tree comprises the step of allowing the user to select a branch at multiple nodes.

31. The method of claim 29, wherein the attribute data of a particular one of the attributes are in a continuum, the runs during which the outcome occurred are in a first class and the runs during which the outcome did not occur are in a second class, and wherein the step of building the induction tree comprises the steps of dividing the attribute data associated with the particular one of the attributes into first and second sets according to the classes of the runs during which the attribute data was collected, determining a statistical property of the first set, determining a statistical property of the second set and developing value groups for the particular one of the attributes from the statistical properties of the first and second sets.

32. The method of claim 31, wherein the step of developing the value groups includes the steps of (a) developing first and second subsets of attribute data from the first and second sets wherein the first subset includes the attribute data of the first set which are greater than the statistical property of the first set and the second subset includes the attribute data of the second set which are less than the statistical property of the second set, (b) determining a statistical property of the first subset, (c) determining a statistical property of the second subset, (d) replacing the statistical properties of the first and second sets with the statistical properties of the first and second subsets, respectively, if the statistical property of the first subset is less than the statistical property of the second subset, (e) repeating the steps (a) through (d) until the statistical property of the first subset is greater than or equal to the statistical property of the second subset and (f) defining a first value group having attribute data in a region below the statistical property of the first set, a second value group having attribute data in a region between the statistical property of the first set and the statistical property of the second set and a third value group having attribute data in a region above the statistical property of the second set.

33. The method of claim 32, wherein the statistical property of the first set is the same as the statistical property of the second set.

34. The method of claim 32, wherein the statistical property of one of the first and second sets is a median.

35. A method of determining a cause of a particular result of a process from values each associated with one of a first plurality of attributes arising during each of a second plurality of runs of the process, comprising the steps of:

(a) defining a data set to include the plurality of values;

(b) dividing the values associated with each of the first plurality of attributes within the data set into value groups wherein the values associated with a certain one of the attributes are in a continuum and the step of dividing includes the steps of;

(1) grouping the runs during which the particular result occurred into a first class and grouping the runs during which the particular result did not occur into a second class, (2) dividing the continuum into a set of ranges wherein each value group associated with the certain one of the attributes includes the values within one of the ranges including the steps of;

(i) dividing the values associated with the certain one of the attributes into first and second sets according to the classes of the runs during which the values arose, (ii) determining a statistical property of the first set, (iii) determining a statistical property of the second set, (iv) developing first and second subsets of values from the first and second sets wherein the first subset includes the values of the first set which are greater than the statistical property of the first set and the second subset includes the values of the second set which are less than the statistical property of the second set, (v) determining a statistical property of the first subset, (vi) determining a statistical property of the second subset, (vii) replacing the statistical properties of the first and second sets with the statistical properties of the first and second subsets, respectively, if the statistical property of the first subset is less than the statistical property of the second subset, (viii) repeating the steps (iv) through (vii) until the statistical property of the first subset is greater than or equal to the statistical property of the second subset, and (ix) defining a first range having a region below the statistical property of the first set, a second range having a region between the statistical property of the first set and the statistical property of the second set and a third range having a region above the statistical property of the second set;

(c) allowing a user to select one of the attributes;

(d) designating a value group of the selected attribute as an endpoint of an induction tree when the value group satisfies an endpoint criterion and, otherwise, designating the value group of the selected attribute as a branching point of the induction tree, wherein the value group designated as a branching point contains a certain number of values which are associated with a certain number of runs;

(e) redefining the data set to include only the values associated with the certain number of runs;

(f) repeating steps (b) through (e) until a value group is designated as an endpoint in step (d); and (g) identifying one or more of the value groups designated as one of the endpoints and the value groups designated as branching points within a path to one of the endpoints as a cause of the particular result.

36. The method of claim 35, further including the step of calculating a figure of merit for a particular number of the attributes from the value groups for the particular number of the attributes and indicating the figures of merit for the particular number of the attributes to a user prior to the step of selecting one of the attributes.

37. The method of claim 35, wherein the runs during which the particular result occurred are in a first class and the runs during which the particular result did not occur are in a second class and wherein the endpoint criterion is satisfied when a predetermined percentage of the runs during which the values within the value group being designated arose are in one of the first and second classes.

38. The method of claim 35, further including the steps of generating a solution including ranges of values for a third plurality of the attributes from the value groups identified as the cause of the particular result and forcing each of the values of the third plurality of the attributes of a run of the process to be within the ranges of the third plurality of the attributes in the solution.

39. The method of claim 35, further including the steps of generating a solution including ranges of values for a third plurality of the attributes from the value groups identified as the cause of the particular result and forcing each of the values of the third plurality of the attributes of a run of the process to be outside of the ranges of the third plurality of the attributes in the solution.

40. The method of claim 35, further including the steps of identifying the first plurality of attributes arising during each run of the process and obtaining the values each associated with one of the first plurality of attributes arising during the second plurality of runs of the process.

41. The method of claim 35, wherein the runs during which the particular result occurred are in a first class and the runs during which the particular result did not occur are in a second class and further including the steps of identifying a class heuristic defining an expected distribution of classes among value groups of one of the attributes and determining whether an actual distribution of classes among the value groups of the one of the attributes is consistent with the class heuristic.

42. The method of claim 41, further including the step of inhibiting the selection of the one of the attributes as the selected attribute when the actual distribution of classes among the value groups of the one of the attributes is inconsistent with the class heuristic.

43. The method of claim 41, further including the step of changing the class heuristic for the one of the attributes when the actual distribution of classes among the value groups of the one of the attributes is inconsistent with the class heuristic.

44. The method of claim 35, further including the step of allowing termination of branching from a branching point interactively.

45. The method of claim 35, wherein the statistical property of the first set is the same as the statistical property of the second set.

46. The method of claim 35, wherein the statistical property of one of the first and second sets is a median.

47. A method of controlling the incidence of a particular result which arises during a run of a process using values each associated with one of a first plurality of attributes arising during each of a second plurality of runs of the process, wherein the values associated with one of the attributes fall within a continuum, and wherein a certain number of runs are grouped into a plurality of classes based on the occurrence of the particular result within each of the certain number of runs, comprising the steps of:

(A) constructing an induction tree from the plurality of values including the steps of, (a) dividing the values associated with the one of the attributes into first and second sets according to the classes of the runs during which the values arose, (b) determining a statistical property of the first set, (c) determining a statistical property of the second set, and (d) dividing the values associated with the one of the attributes into ranges defined in accordance with the statistical properties of the first and second sets including the steps of, (i) developing first and second subsets of values from the first and second sets wherein the first subset includes the values of the first set which are greater than the statistical property of the first set and the second subset includes the values of the second set which are less than the statistical property of the second set, (ii) determining a statistical property of the first subset, (iii) determining a statistical property of the second subset, (iv) replacing the statistical properties of the first and second sets with the statistical properties of the first and second subsets, respectively, if the statistical property of the first subset is less than the statistical property of the second subset, (v) repeating the steps (i) through (iv) until the statistical property of the first subset is greater than or equal to the statistical property of the second subset, and (vi) defining a first range having a region below the statistical property of the first set, a second range having a region between the statistical property of the first set and the statistical property of the second set and a third range having a region above the statistical property of the second set;

(B) determining a cause of the particular result from the induction tree; and (C) controlling a run of the process in accordance with the determined cause to either reduce or increase the probability of incidence of the particular result.

48. The method of claim 47, wherein the statistical property of the first set and the statistical property of the second set are the same statistical property.

49. The method of claim 47, wherein the statistical property of one of the first and second sets is a median.

50. The method of claim 47, wherein the step of building an induction tree further comprises the steps of dividing the values associated with each of the first plurality of attributes into value groups, wherein each of the value groups associated with the one of the attributes comprises one of the ranges, selecting a particular one of the attributes, designating one of the value groups of the selected attribute as an endpoint of an induction tree when the one of the value groups satisfies an endpoint criterion and, otherwise, designating the one of the value groups as a branching point of the induction tree.

51. The method of claim 50, wherein the step of selecting a particular one of the attributes comprises interactively selecting the particular one of the attributes.

52. The method of claim 50, including the step of identifying a class heuristic defining an expected distribution of classes among value groups of a certain one of the attributes and wherein the step of building the induction tree comprises the step of determining whether an actual distribution of classes among the value groups of the certain one of the attributes is consistent with the class heuristic.

53. The method of claim 52, wherein the step of selecting a particular one of the attributes comprises interactively selecting the particular one of the attributes.

54. The method of claim 52, wherein the one of the attributes, the particular one of the attributes and the certain one of the attributes comprise a different one of the first plurality of attributes.

55. A method of controlling the incidence of a particular result which arises during a run of a process using a plurality of values each associated with one of a first plurality of attributes arising during each of a second plurality of runs of the process, wherein a class heuristic which defines an expected distribution of classes among value groups of a certain one of the attributes is identified, comprising the steps of:

(a) defining a data set to include the plurality of values;

(b) dividing the values within the data set and which are associated with each of the attributes into value groups;

(c) comparing an actual distribution of classes among value groups of the certain one of the attributes with the class heuristic;

(d) selecting one of the attributes based on the step of comparing;

(e) designating one of the value groups of the selected attribute as an endpoint when an endpoint criterion is satisfied and, otherwise, designating the one of the value groups of the selected attribute as a branching point, wherein a value group designated as a branching point contains a certain number of values associated with a certain number of runs;

(f) redefining the data set to include only the values associated with the certain number of runs;

(g) repeating steps (b) through (f) until a value group is designated as an endpoint in step (e);

(i) identifying one of the value groups designated as the endpoint and the value groups designated as branching points within a path to the endpoint as a cause of the particular result; and (j) controlling a run of the process in accordance with the identified cause to either reduce or increase the probability of incidence of the particular result.

56. The method of claim 55, wherein the step of selecting one of the attributes includes the step of calculating a figure of merit for attributes from the value groups of the attributes.

57. The method of claim 55, wherein the step of selecting one of the attributes includes the step of inhibiting the selection of the certain one of the attributes as the selected attribute when the actual distribution of classes among the value groups of the certain one of the attributes is inconsistent with the class heuristic.

58. The method of claim 55, further including the step of identifying the certain one of the attributes to the user when the actual distribution of classes among the value groups of the certain one of the attributes is inconsistent with the class heuristic for the certain one the of attributes.

59. The method of claim 58, further including the step of changing the class heuristic when the actual distribution of classes among the value groups of the certain one of the attributes is inconsistent with the class heuristic.

60. The method of claim 58, wherein the step of selecting one of the attributes comprises allowing a user to interactively select one of the attributes.

61. A system for use in developing an indication of a cause of a particular result of a process from values each associated with one of a first plurality of attributes arising during an associated one of a second plurality of runs of the process, wherein the runs during which the particular result occurred are in a first class and the runs during which the particular result did not occur are in a second class, comprising:

data entry means for permitting a user to enter data indicating the attribute values and the class associated with each of the second plurality of runs;

a memory for storing the data indicating the plurality of attribute values and the class associated with each of the second plurality of runs;

a processing unit including, means for dividing the values associated with each of the attributes into value groups wherein the values associated with a particular one of the attributes are in a continuum and wherein the dividing means divides the continuum into a set of ranges such that each value group associated with the particular one of the attributes includes the values within one of the ranges, the dividing means including;

(1) means for separating the values of the particular one of the attributes into first and second sets according to the classes of the runs during which the values arose, (2) first means for measuring a statistical property of the first set, (3) second means for measuring a statistical property of the second set, and (4) means for developing the set of ranges from the statistical properties of the first and second sets including (a) means for deriving first and second subsets of values from the first and second sets wherein the first subset includes the values of the first set which are greater than the statistical property of the first set and the second subset includes the values of the second set which are less than the statistical property of the second set, (b) means for finding a statistical property of the first and second subsets, (c) means coupled to the deriving means for replacing the statistical properties of the first and second sets with the statistical properties of the first and second subsets, respectively, if the statistical property of the first subset is less than the statistical property of the second subset and (d) means coupled to the deriving means and operable when the statistical property of the first subset is greater than or equal to the statistical property of the second subset for defining a first range having a region below the statistical property of the first set, a second range having a region between the statistical property of the first set and the statistical property of the second set and a third range having a region above the statistical property of the second set, means for selecting any one of the first plurality of attributes, means for designating a value group of the selected attribute as an endpoint of an induction tree when the value group satisfies an endpoint criteria and, otherwise, designating the value group of the selected attribute as a branching point of the induction tree, means operative when a value group of the selected attribute is designated as a branching point for redividing the values associated with attributes other than the selected attribute into further value groups, means operative when a value group of the selected attribute is designated as a branching point and coupled to the redividing means for choosing a further attribute, and further means coupled to the choosing means for determining whether any further value group of the further attribute satisfies the endpoint criterion and thus comprises an endpoint of the induction tree; and an output device which develops a representation of the induction tree for the user.

62. The system of claim 61, wherein the statistical property of the first set is the same as the statistical property of the second set.

63. The system of claim 61, wherein the statistical property of one of the first and second sets is a median.

64. The system of claim 61, wherein the selecting means includes means for allowing a user to select any one of the first plurality of attributes and the choosing means includes means for permitting a user to select the further attribute.

\* \* \* \* \*